(12) United States Patent
Ovsiannikov et al.

(10) Patent No.: US 11,924,545 B2
(45) Date of Patent: Mar. 5, 2024

(54) CONCURRENT RGBZ SENSOR AND SYSTEM

(71) Applicant: Samsung Electronics Co., Ltd., Suwon-si (KR)

(72) Inventors: Ilia Ovsiannikov, Studio City, CA (US); Yibing Michelle Wang, Temple City, CA (US); Gregory Waligorski, Pasadena, CA (US); Qiang Zhang, Pasadena, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/941,000

(22) Filed: Sep. 8, 2022

(65) Prior Publication Data

US 2023/0007175 A1  Jan. 5, 2023

Related U.S. Application Data

(63) Continuation of application No. 14/856,552, filed on Sep. 16, 2015, now abandoned, which is a
(Continued)

(51) Int. Cl.
*H04N 23/00* (2023.01)
*G06T 7/521* (2017.01)
*H04N 23/667* (2023.01)

(52) U.S. Cl.
CPC .......... *H04N 23/667* (2023.01); *G06T 7/521* (2017.01); *H04N 2213/003* (2013.01)

(58) Field of Classification Search
CPC . H04N 5/00; H04N 7/00; H04N 13/00; G06T 7/00
See application file for complete search history.

(56) References Cited

U.S. PATENT DOCUMENTS 5,675,407 A   10/1997  Geng
7,102,683 B2   9/2006  Perry et al.
(Continued)

FOREIGN PATENT DOCUMENTS

CN   103460072 B   12/2013
CN   103516946 A    1/2014
(Continued)

OTHER PUBLICATIONS

Final Office Action for U.S. Appl. No. 14/842,822, dated Jun. 28, 2018.
(Continued)

*Primary Examiner* — Maryam A Nasri
(74) *Attorney, Agent, or Firm* — Renaissance IP Law Group LLP

(57) ABSTRACT

Two-dimensional (2D) color information and 3D-depth information are concurrently obtained from a 2D pixel array. The 2D pixel array is arranged in a first group of a plurality of rows. A second group of rows of the array are operable to generate 2D-color information and pixels of a third group of the array are operable to generate 3D-depth information. The first group of rows comprises a first number of rows, the second group of rows comprises a second number of rows that is equal to or less than the first number of rows, and the third group of rows comprises a third number of rows that is equal to or less than the second number of rows. In an alternating manner, 2D-color information is received from a row selected from the second group of rows and 3D-depth information is received from a row selected from the third group of rows.

20 Claims, 12 Drawing Sheets

Related U.S. Application Data continuation-in-part of application No. 14/842,822, filed on Sep. 1, 2015, now Pat. No. 10,145,678.

(60) Provisional application No. 62/203,386, filed on Aug. 10, 2015, provisional application No. 62/182,404, filed on Jun. 19, 2015, provisional application No. 62/150,252, filed on Apr. 20, 2015.

(56) References Cited

U.S. PATENT DOCUMENTS

| | | | |
|---|---|---|---|
| 7,242,997 B2 | 7/2007 | Geng | |
| 7,483,151 B2 | 1/2009 | Zganec et al. | |
| 8,139,141 B2 | 3/2012 | Bamji et al. | |
| 8,363,156 B2 | 1/2013 | Lo | |
| 8,456,517 B2 | 6/2013 | Spektor et al. | |
| 8,565,479 B2 | 10/2013 | Gurman et al. | |
| 8,582,867 B2 | 11/2013 | Litvak | |
| 8,639,046 B2 | 1/2014 | Aggarwal | |
| 8,670,029 B2 | 3/2014 | McEldowney | |
| 8,681,216 B2 | 3/2014 | Atkinson | |
| 8,681,255 B2 | 3/2014 | Katz et al. | |
| 8,711,370 B1 | 4/2014 | Smits | |
| 8,717,416 B2 | 5/2014 | Russell et al. | |
| 8,717,417 B2 | 5/2014 | Sali et al. | |
| 8,786,678 B2 | 7/2014 | Schmidt et al. | |
| 8,787,663 B2 | 7/2014 | Litvak et al. | |
| 8,810,647 B2 | 8/2014 | Niclass et al. | |
| 8,848,039 B2 | 9/2014 | Spektor et al. | |
| 8,908,958 B2 | 12/2014 | Kimmel et al. | |
| 9,056,254 B2 | 6/2015 | Pellman et al. | |
| 9,110,470 B2 | 8/2015 | Karlsson et al. | |
| 9,143,680 B2 | 9/2015 | Lee et al. | |
| 9,332,243 B2 | 5/2016 | Klusza et al. | |
| 9,491,441 B2 | 11/2016 | Sarmast et al. | |
| 9,525,863 B2 | 12/2016 | Nawasra et al. | |
| 9,667,883 B2 | 5/2017 | Chang et al. | |
| 9,767,571 B2 | 9/2017 | Lee et al. | |
| 10,132,616 B2 | 11/2018 | Wang | |
| 10,312,616 B2 | 6/2019 | Tan | |
| 10,704,896 B2 | 7/2020 | Wang | |
| 10,718,605 B2 | 7/2020 | Wang | |
| 10,883,821 B2 | 1/2021 | Wang | |
| 10,883,822 B2 | 1/2021 | Wang | |
| 11,002,531 B2 | 5/2021 | Wang et al. | |
| 11,131,542 B2 | 9/2021 | Wang et al. | |
| 2002/0196243 A1 | 12/2002 | Morita | |
| 2006/0221250 A1* | 10/2006 | Rossbach | H04N 23/84 348/663 |
| 2008/0239088 A1 | 10/2008 | Yamashita | |
| 2009/0244309 A1 | 10/2009 | Maison et al. | |
| 2010/0074532 A1 | 3/2010 | Gordon et al. | |
| 2011/0025827 A1 | 2/2011 | Shpunt et al. | |
| 2011/0037849 A1 | 2/2011 | Niclass et al. | |
| 2011/0040217 A1 | 2/2011 | Centen | |
| 2011/0102763 A1* | 5/2011 | Brown | G01S 7/481 356/4.01 |
| 2011/0279648 A1 | 11/2011 | Lutian et al. | |
| 2012/0105587 A1 | 5/2012 | Lee et al. | |
| 2012/0113231 A1 | 5/2012 | Kim et al. | |
| 2012/0204094 A1 | 8/2012 | Liang | |
| 2012/0246899 A1 | 10/2012 | Yamada et al. | |
| 2013/0107005 A1 | 5/2013 | Lim et al. | |
| 2013/0107010 A1 | 5/2013 | Hoiem et al. | |
| 2013/0127854 A1 | 5/2013 | Shpunt et al. | |
| 2013/0207970 A1 | 8/2013 | Shpunt et al. | |
| 2013/0300838 A1 | 11/2013 | Borowski | |
| 2014/0021356 A1 | 1/2014 | Zwaans et al. | |
| 2014/0022348 A1 | 1/2014 | Shpunt | |
| 2014/0027613 A1* | 1/2014 | Smith | H01L 27/14621 250/208.1 |
| 2014/0055565 A1 | 2/2014 | You et al. | |
| 2014/0078381 A1 | 3/2014 | Ovsiannikov et al. | |
| 2014/0192160 A1 | 7/2014 | Chang et al. | |
| 2014/0225985 A1* | 8/2014 | Klusza | H04N 13/271 348/46 |
| 2014/0232822 A1 | 8/2014 | Venkataraman et al. | |
| 2014/0232827 A1 | 8/2014 | Kumar et al. | |
| 2014/0300701 A1 | 10/2014 | Park et al. | |
| 2014/0333917 A1 | 11/2014 | Payne et al. | |
| 2015/0001664 A1 | 1/2015 | Van Der Tempel et al. | |
| 2015/0062306 A1 | 3/2015 | Ayyagari et al. | |
| 2015/0062558 A1 | 3/2015 | Koppal et al. | |
| 2016/0069779 A1 | 3/2016 | Uffenkamp et al. | |
| 2017/0052065 A1 | 2/2017 | Sharma et al. | |
| 2017/0176579 A1 | 6/2017 | Niclass et al. | |
| 2019/0004156 A1 | 1/2019 | Niclass et al. | |

FOREIGN PATENT DOCUMENTS

| | | |
|---|---|---|
| CN | 103765879 A | 4/2014 |
| CN | 103916660 A | 7/2014 |
| CN | 104346427 A | 2/2015 |
| CN | 105453559 B | 3/2016 |
| DE | 102013208802 A1 | 12/2013 |
| EP | 2026035 A2 | 2/2009 |
| EP | 2469300 B1 | 8/2012 |
| EP | 2790034 A1 | 10/2014 |
| KR | 20140022858 A | 2/2014 |
| KR | 20140121710 A | 10/2014 |
| WO | 2010004542 A1 | 1/2010 |
| WO | 2010139609 A1 | 12/2010 |
| WO | 2012133926 A2 | 10/2012 |
| WO | 2013127973 A1 | 9/2013 |
| WO | 2014128498 A2 | 8/2014 |
| WO | 2014204111 A1 | 12/2014 |
| WO | 2015136099 A2 | 9/2015 |

OTHER PUBLICATIONS

Final Office Action for U.S. Appl. No. 14/856,552, dated Apr. 4, 2019.
Final Office Action for U.S. Appl. No. 14/856,552, dated Feb. 16, 2022.
Final Office Action for U.S. Appl. No. 14/856,552, dated Jul. 26, 2018.
Final Office Action for U.S. Appl. No. 14/856,552, dated Oct. 3, 2019.
Office Action for U.S. Appl. No. 14/842,822, dated Jan. 19, 2018.
Office Action for U.S. Appl. No. 14/842,825, dated Dec. 27, 2017.
Office Action for U.S. Appl. No. 14/856,552, dated Jul. 8, 2022.
Office Action for U.S. Appl. No. 14/856,552, dated Jun. 27, 2019.
Office Action for U.S. Appl. No. 14/856,552, dated Nov. 19, 2018.
Office Action for U.S. Appl. No. 14/973,709, dated Jan. 23, 2018.
Office Action for U.S. Appl. No. 16/149,023, dated Feb. 6, 2019.
Office Action for U.S. Appl. No. 16/186,477, dated Dec. 2, 2019.
Office Action for U.S. Appl. No. 16/191,415, dated Nov. 7, 2019.
Office Action for U.S. Appl. No. 16/549,577, dated May 14, 2020.
Office Action for U.S. Appl. No. 16/595,461, dated Apr. 3, 2020.
Office Action for U.S. Appl. No. 16/988,593, dated Oct. 30, 2020.
Office Action for U.S. Appl. No. 17/076,790, dated May 5, 2022.
Office Action for U.S. Appl. No. 17/076,799, dated Oct. 4, 2021.
Office Action for U.S. Appl. No. 17/093,632, dated Dec. 9, 2021.
Office Action for U.S. Appl. No. 17/316,701, dated Sep. 30, 2022.
Corrected Notice of Allowability for U.S. Appl. No. 17/076,790, dated Apr. 14, 2023.
Corrected Notice of Allowability for U.S. Appl. No. 17/316,701, dated Apr. 13, 2023.
Corrected Notice of Allowability for U.S. Appl. No. 17/847,132, dated Apr. 13, 2023.
Advisory Action for U.S. Appl. No. 14/856,552, dated Dec. 5, 2019.
Cho, Jaeil et al., "Stereo Vision System for Intelligent Robot," Electronic Communication Trend Analysis, vol. 22, No. 2, Apr. 2007, 25 pages.
Corrected Notice of Allowability for U.S. Appl. No. 16/595,461, dated Apr. 5, 2021.
Corrected Notice of Allowability for U.S. Appl. No. 17/076,799, dated Jun. 6, 2022.

(56) References Cited

OTHER PUBLICATIONS

Corrected Notice of Allowability for U.S. Appl. No. 17/076,799, dated May 12, 2022.
Corrected Notice of Allowability for U.S. Appl. No. 17/093,632, dated Jul. 22, 2022.
Corrected Notice of Allowability for U.S. Appl. No. 17/093,632, dated Jun. 2, 2022.
Corrected Notice of Allowability for U.S. Appl. No. 17/093,632, dated May 11, 2022.
Decision on Appeal for U.S. Appl. No. 14/856,552, mailed Nov. 15, 2021.
Lange, Robert, "3D time-of-flight distance measurement with custom solid-state image sensors in CMOS/CCD-technology," Department of Electrical Engineering and Computer Science at University of Siegen, submitted Jun. 28, 2000, 223 pages.
Mandai et al., "Ultra High Speed 3-D Image Sensor" International Image Sensor Workshop (IISW), Jun. 2009, 4 pages.
Matsuda et al., "MC3D: Motion Contrast 3D Scanning" 2015 IEEE International Conference on Computational Photography (ICCP), Apr. 2015, 10 pages.
Non-Final Office Action for U.S. Appl. No. 14/856,552, dated Feb. 23, 2018.
Notice of Allowance for U.S. Appl. No. 14/842,822, dated Oct. 3, 2018.
Notice of Allowance for U.S. Appl. No. 14/842,825, dated Aug. 8, 2018.
Notice of Allowance for U.S. Appl. No. 14/973,709, dated Jul. 12, 2018.
Notice of Allowance for U.S. Appl. No. 16/149,023, dated May 22, 2019.
Notice of Allowance for U.S. Appl. No. 16/186,477, dated Feb. 27, 2020.
Notice of Allowance for U.S. Appl. No. 16/191,415, dated Mar. 11, 2020.
Notice of Allowance for U.S. Appl. No. 16/549,577, dated Sep. 2, 2020.
Notice of Allowance for U.S. Appl. No. 16/595,461, dated Dec. 2, 2020.
Notice of Allowance for U.S. Appl. No. 16/595,461, dated Jun. 25, 2020.
Notice of Allowance for U.S. Appl. No. 16/838,025, dated Sep. 3, 2020.
Notice of Allowance for U.S. Appl. No. 16/852,406, dated Sep. 4, 2020.
Notice of Allowance for U.S. Appl. No. 16/988,593, dated Feb. 19, 2021.
Notice of Allowance for U.S. Appl. No. 16/988,593, dated May 27, 2021.
Notice of Allowance for U.S. Appl. No. 17/076,790, dated Nov. 14, 2022.
Notice of Allowance for U.S. Appl. No. 17/076,799, dated Feb. 23, 2022.
Notice of Allowance for U.S. Appl. No. 17/093,632, dated Mar. 18, 2022.
Oike et al., "A 375 365 High-Speed 3-D Range-Finding Image Sensor Using Row-Parallel Search Architecture and Multisampling Technique", IEEE Journal of Solid-State Circuits, vol. 40, No. 2, Feb. 2005, 10 pages.
O'Toole et al., "Homogeneous Codes for Energy-Efficient Illumination and Imaging" ACM SIGGRAPH, 2015, 13 pages.
Primesense Ltd., "PrimeSense 3D Sensors", (www.primesense.com, retrieved from https://www.i3du.gr/pdf/primesense.pdf on Nov. 4, 2019), 4 pages.
Corrected Notice of Allowability for U.S. Appl. No. 17/076,790, dated Mar. 2, 2023.
Corrected Notice of Allowability for U.S. Appl. No. 17/076,790, dated Mar. 7, 2023.
Notice of Allowance for U.S. Appl. No. 17/316,701, dated Mar. 28, 2023.
Notice of Allowance for U.S. Appl. No. 17/847,132, dated Mar. 31, 2023.
Final Office Action for U.S. Appl. No. 17/316,701, dated Jan. 20, 2023.
Office Action for U.S. Appl. No. 17/847,132, dated Dec. 8, 2022.

* cited by examiner

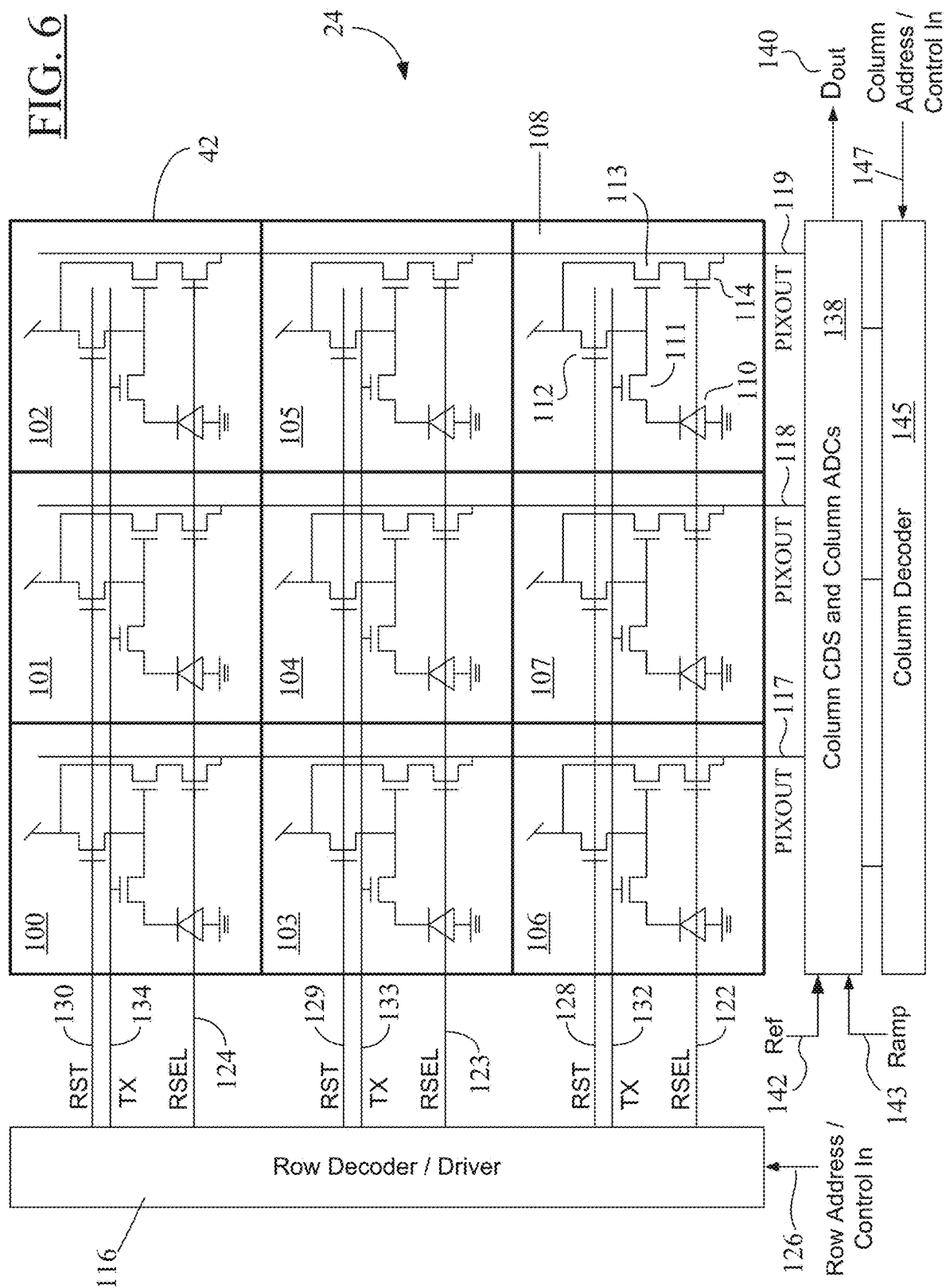

CONCURRENT RGBZ SENSOR AND SYSTEM

CROSS-REFERENCE TO RELATED APPLICATIONS

This is a continuation of U.S. patent application Ser. No. 14/856,552, filed Sep. 16, 2015, which is a continuation-in-part patent application of U.S. patent application Ser. No. 14/842,822 filed Sep. 1, 2015, now U.S. Pat. No. 10,145,678, issued Dec. 4, 2018, and claims the priority benefit under 35 U.S.C. § 119(e) of U.S. Provisional Patent Application Ser. No. 62/150,252 filed Apr. 20, 2015, U.S. Provisional Patent Application Ser. No. 62/182,404 filed Jun. 19, 2015, and U.S. Provisional Patent Application Ser. No. 62/203,386 filed Aug. 10, 2015, and the disclosures of each are incorporated herein by reference in their entireties.

TECHNICAL FIELD

The present disclosure generally relates to image sensors. More specifically, and not by way of limitation, particular embodiments disclosed herein are directed to a triangulation-based system and method of depth measurements on a three-dimensional (3D) object using a laser point scan and a Complementary Metal Oxide Semiconductor (CMOS) image sensor, which is also used for two-dimensional (2D) imaging of the 3D object.

BACKGROUND

Three-dimensional (3D) imaging systems are increasingly being used in a wide variety of applications, such as industrial production, video games, computer graphics, robotic surgeries, consumer displays, surveillance videos, 3D modeling, real estate sales, and so on.

Existing 3D-imaging technologies may include, for example, the time-of-flight (TOF) based range imaging, stereo vision systems, and structured light (SL) methods.

In the TOF method, distance to a 3D object is resolved based on the known speed of light—by measuring the round-trip time it takes for a light signal to travel between a camera and the 3D object for each point of the image. A TOF camera may use a scannerless approach to capture the entire scene with each laser or light pulse. Some exemplary applications of the TOF method may include advanced automotive applications, such as active pedestrian safety or pre-crash detection based on distance images in real time; to track movements of humans such as during interaction with games on video-game consoles; in industrial machine vision to classify objects and help robots find the items, such as items on a conveyor belt, and so on.

In stereoscopic-imaging or stereo-vision systems, two cameras—displaced horizontally from one another—are used to obtain two differing views on a scene or a 3D object in the scene. By comparing these two images, the relative depth information can be obtained for the 3D object. Stereo vision is highly important in fields, such as robotics, to extract information about the relative position of 3D objects in the vicinity of autonomous systems/robots. Other applications for robotics include object recognition in which stereoscopic depth information allows a robotic system to separate occluding image components, which the robot may otherwise not be able to distinguish as two separate objects—such as one object in front of another, partially or fully hiding the other object. 3D stereo displays are also used in entertainment and automated systems.

In the SL approach, the 3D shape of an object may be measured using projected light patterns and a camera for imaging. In the SL method, a known pattern of light—often grids or horizontal bars or patterns of parallel stripes—is projected onto a scene or a 3D object in the scene. The projected pattern may become deformed or displaced when striking the surface of the 3D object. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging maybe used in different applications such as, by a police force to photograph fingerprints in a 3D scene, inline inspection of components during a production process, in health care for live measurements of human body shapes or the micro structures of human skin, and the like.

SUMMARY

One exemplary embodiment provides a method, comprising: receiving an image of at least one object at an image sensor, the image sensor comprising a two-dimensional (2D) pixel array arranged in a first group of a plurality of rows, pixels of a second group of rows of the array being operable to generate 2D-color information of the at least one object, pixels of a third group of the array being operable to generate 3D-depth information of the at least one object, the first group of rows comprising a first number of rows, the second group of rows comprising a second number of rows that is equal to or less than the first number of rows, and the third group of rows comprising a third number of rows that is equal to or less than the second number of rows; and receiving in an alternatingly manner 2D-color information of the at least one object from a row selected from the second group of rows and receiving 3D-depth information of the at least one object from a row selected from the third group of rows.

One exemplary embodiment provides an image sensor unit, comprising a two-dimensional (2D) pixel array, and a controller. The 2D pixel array is arranged in a first group of a plurality of rows. Pixels of a second group of rows of the array are operable to generate 2D-color information based on an image of at least one object received by the 2D pixel array, and pixels of a third group of the array are operable to generate 3D-depth information of the at least one object. The first group of rows comprise a first number of rows, the second group of rows comprises a second number of rows that is equal to or less than the first number of rows, and the third group of rows comprises a third number of rows that is equal to or less than the second number of rows. The controller is coupled to the 2D pixel array to select in an alternatingly manner a row from the second group of rows to output the generated 2D-color information based on the image of the at least one object and a row from the third group of rows to output the generated 3D-depth information of the at least one object.

One exemplary embodiment provides a system, comprising a two-dimensional (2D) pixel array, a controller and a display. The 2D pixel array is arranged in a first group of a plurality of rows in which pixels of a second group of rows of the array are operable to generate 2D-color information based on an image of at least one object received by the 2D pixel array and in which pixels of a third group of the array are operable to generate 3D-depth information of the at least one object. The first group of rows comprises a first number of rows, the second group of rows comprises a second number of rows that is equal to or less than the first number of rows, and the third group of rows comprises a third number of rows that is equal to or less than the second number of rows. The controller is coupled to the 2D pixel array to select in an alternating manner a row from the second group of rows to output the generated 2D-color information based on the image of the at least one object and a row from the third group of rows to output the generated 3D-depth information of the at least one object. The display is coupled to the 2D pixel array and the controller, and is operative to display a first image of the at least one object based on the generated 2D-color information and to display a second image of the at least one object based on the generated 3D-depth information.

BRIEF DESCRIPTION OF THE DRAWINGS

In the following section, the aspects of the subject matter disclosed herein will be described with reference to exemplary embodiments illustrated in the figures, in which:

FIG. 6 shows exemplary circuit details of the 2D pixel array and a portion of the associated processing circuits in the image-processing unit of the image sensor in FIGS. 1 and 2 according to one embodiment disclosed herein;

DETAILED DESCRIPTION

Figure 1:
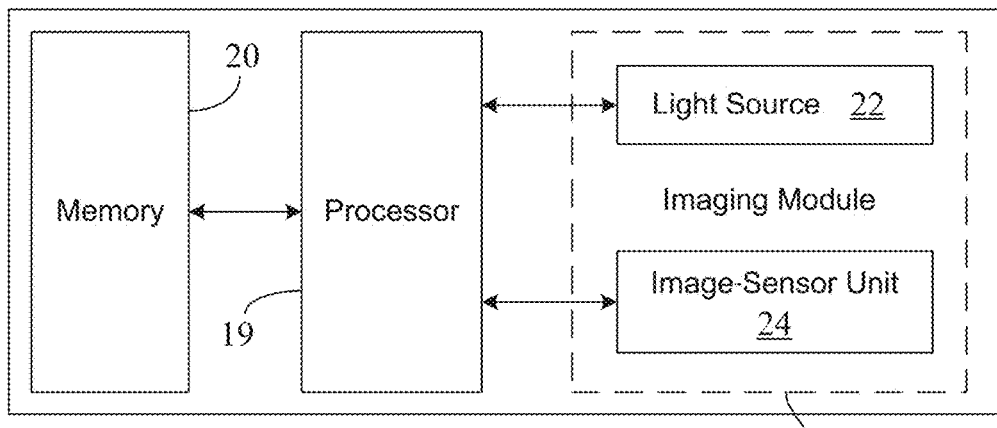
FIG. 1 shows a highly simplified, partial configuration of a system according to one embodiment disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein. Additionally, the described aspects can be implemented to perform low power, 3D-depth measurements in any imaging device or system, including, for example, a smartphone, a User Equipment (UE), a laptop computer, and the like.

Reference throughout this specification to "one embodiment" or "an embodiment" means that a particular feature, structure, or characteristic described in connection with the embodiment is included in at least one embodiment disclosed herein. Thus, the appearances of the phrases "in one embodiment" or "in an embodiment" or "according to one embodiment" (or other phrases having similar import) in various places throughout this specification are not necessarily all referring to the same embodiment. As used herein, the word "exemplary" means "serving as an example, instance, or illustration." Any embodiment described herein as "exemplary" is not to be construed as necessarily preferred or advantageous over other embodiments. Furthermore, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

It is noted at the outset that the terms "coupled," "operatively coupled," "connected," "connecting," "electrically connected," etc., may be used interchangeably herein to generally refer to the condition of being electrically/electronically connected in an operative manner. Similarly, a first entity is considered to be in "communication" with a second entity (or entities) if the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

It is observed here that the earlier-mentioned 3D technologies have many drawbacks. For example, a TOF-based 3D-imaging system may require high power to operate optical or electrical shutters. These systems typically operate over a range of few meters to several tens of meters, but the resolution of these systems decreases for measurements over short distances, thereby making 3D imaging within a distance of about one meter almost impractical. Hence, a TOF system may not be desirable for cell phone-based camera applications in which pictures are pre-dominantly taken at close distances. A TOF sensor may also require special pixels with big pixel sizes, usually larger than 7 µm. These pixels also may be vulnerable to ambient light.

The stereoscopic imaging approach generally works only with textured surfaces. It has high-computational complexity because of the need to match features and find correspondences between the stereo pair of images of an object. This requires high system power, which is not a desirable attribute in applications in which power conservation is needed, such as in smartphones. Furthermore, stereo imaging requires two regular, high bit resolution sensors along with two lenses, making the entire assembly unsuitable for applications in portable devices, like cell phones or tablets in which device real estate is at a premium.

The SL approach introduces distance ambiguity, and also requires high system power. For 3D-depth measurements, the SL method may need multiple images with multiple patterns—all of these increase computational complexity and power consumption. Furthermore, the SL imaging may also require regular image sensors with high bit resolution. Thus, a structured light-based system may not be suitable for low-cost, low-power, compact image sensors in smartphones.

In contrast to the above-mentioned 3D technologies, particular embodiments disclosed herein provide for implementing a low-power, 3D-imaging system on portable electronic devices, such as smartphones, tablets, UEs, and the like. A 2D-imaging sensor as per particular embodiments disclosed herein can capture both 2D RGB (Red, Green, Blue) images and 3D-depth measurements with visible light laser scanning, while being able to reject ambient light during 3D-depth measurements. It is noted here that although the following discussion may frequently mention a visible light laser as a light source for point-scans and a 2D RGB sensor as an image/light capture device, such mention is for the purpose of illustration and consistency of discussion only. The visible laser and RGB sensor-based examples discussed below may find applications in low-power, consumer-grade mobile electronic devices having cameras such as, smartphones, tablets, or UEs. It is, however, understood that the subject matter disclosed herein is not limited to the visible laser-RGB sensor-based examples mentioned below. Rather, according to particular embodiments disclosed herein, the point-scan based 3D-depth measurements and the ambient-light rejection methodology may be performed using many different combinations of 2D sensors and laser light sources (for point scans) such as, but not limited to: (i) a 2D color (RGB) sensor with a visible light laser source in which the laser source may be a red (R), green (G), or blue (B) light laser, or a laser source producing a combination of these lights; (ii) a visible light laser with a 2D RGB color sensor having an Infrared (IR) cut filter; (iii) a Near Infrared (NIR) laser with a 2D IR sensor; (iv) an NIR laser with a 2D NIR sensor; (v) an NIR laser with a 2D RGB sensor (without an IR cut filter); (vi) an NIR laser with a 2D RGB sensor (without an NIR cut filter); (vii) a 2D RGB-IR sensor with visible or NIR laser; (viii) a 2D RGBW (red, green, blue, white) sensor with either visible or NIR laser; and so on.

During 3D-depth measurements, the entire sensor may operate as a binary sensor in conjunction with the laser scan to reconstruct 3D content. In particular embodiments, the pixel size of the sensor can be as small as 1 µm. Furthermore, due to lower bit resolution, the Analog-to-Digital Converter (ADC) units in the image sensor according to particular embodiments disclosed herein may need significantly lower processing power than that that is needed for high-bit-resolution sensors in traditional 3D-imaging systems. Because of the need for less processing power, the 3D-imaging module according to the subject matter disclosed herein may require lower system power and, hence, may be quite suitable for inclusion in low-power devices like smartphones.

In particular embodiments, the subject matter disclosed herein uses triangulation and point scans with a laser light source for 3D-depth measurements with a group of line sensors. The laser-scanning plane and the imaging plane are oriented using epipolar geometry. An image sensor according to one embodiment disclosed herein may use timestamps to remove ambiguity in the triangulation approach, thereby reducing the amount of depth computations and system power. The same image sensor—that is, each pixel in the image sensor—may be used in the normal 2D (RGB color or non-RGB) imaging mode as well as in the 3D-laser-scan mode. In the laser-scan mode, however, the resolution of the ADCs in the image sensor is reduced to a binary output (1-bit resolution only), thereby improving the readout speed and reducing power consumption—for example, due to switching in the ADC units—in the chip incorporating the image sensor and associated processing units. Furthermore, the point-scan approach may allow the system to take all measurements in one pass, thereby reducing the latency for depth measurements and reducing motion blur.

As noted before, in particular embodiments, the entire image sensor may be used for routine 2D RGB color imaging using, for example, ambient light, as well as for 3D-depth imaging using visible laser scan. Such dual use of the same camera unit may save space and cost for mobile devices. Furthermore, in certain applications, a visible laser for 3D applications may be better for user eye safety as compared to a Near Infrared (NIR) laser. The sensor may have higher quantum efficiency at visible spectrum than at the NIR spectrum, leading to lower power consumption of the light source. In one embodiment, the dual-use image sensor may work in a linear mode of operation for 2D imaging as a regular 2D sensor. For 3D imaging, however, the sensor may work in linear mode under moderate lighting condition and in a logarithmic mode under strong ambient light to facilitate continued use of the visible laser source through rejection of the strong ambient light. Furthermore, ambient-light rejection may be needed in case of an NIR laser as well, for example, if the bandwidth of the pass band of an IR-cut filter employed with an RGB sensor is not narrow enough.

FIG. 1 shows a highly simplified, partial configuration of a system 15 according to one embodiment disclosed herein. As shown, the system 15 may include an imaging module 17 coupled to and in communication with a processor or host 19. The system 15 may also include a memory module 20 coupled to the processor 19 to store information content such as, image data received from the imaging module 17. In particular embodiments, the entire system 15 may be encapsulated in a single Integrated Circuit (IC) or chip. Alternatively, each of the modules 17, 19 and 20 may be implemented in a separate chip. Furthermore, the memory module 20 may include more than one memory chip, and the processor module 19 may comprise of multiple processing chips as well. In any event, the details about packaging of the modules in FIG. 1 and how the modules are fabricated or implemented—in a single chip or using multiple discrete chips—are not relevant to the present discussion and, hence, such details are not provided herein.

The system 15 may be any low-power electronic device configured for 2D- and 3D-camera applications as per the subject matter disclosed herein. The system 15 may be portable or non-portable. Some examples of the portable version of the system 15 may include popular consumer electronic gadgets such as, but not limited to, a mobile device, a cellphone, a smartphone, a User Equipment (UE), a tablet, a digital camera, a laptop or desktop computer, an electronic smartwatch, a Machine-to-Machine (M2M) communication unit, a Virtual Reality (VR) equipment or module, a robot, and the like. On the other hand, some examples of the non-portable version of the system 15 may include a game console in a video arcade, an interactive video terminal, an automobile, a machine vision system, an industrial robot, a VR equipment, a driver-side mounted camera in a vehicle (for example, to monitor whether the driver is awake or not), and so on. The 3D-imaging functionality provided as per the subject matter disclosed herein may be used in many applications such as, but not limited to, virtual reality applications on a virtual reality equipment, online chatting/gaming, 3D texting, searching an online or local (device-based) catalog/database using a 3D image of a product to obtain information related to the product (for example, calorie content of a piece of food item), robotics and machine vision applications, vehicular applications, such as autonomous driving applications, and the like.

Figure 2:
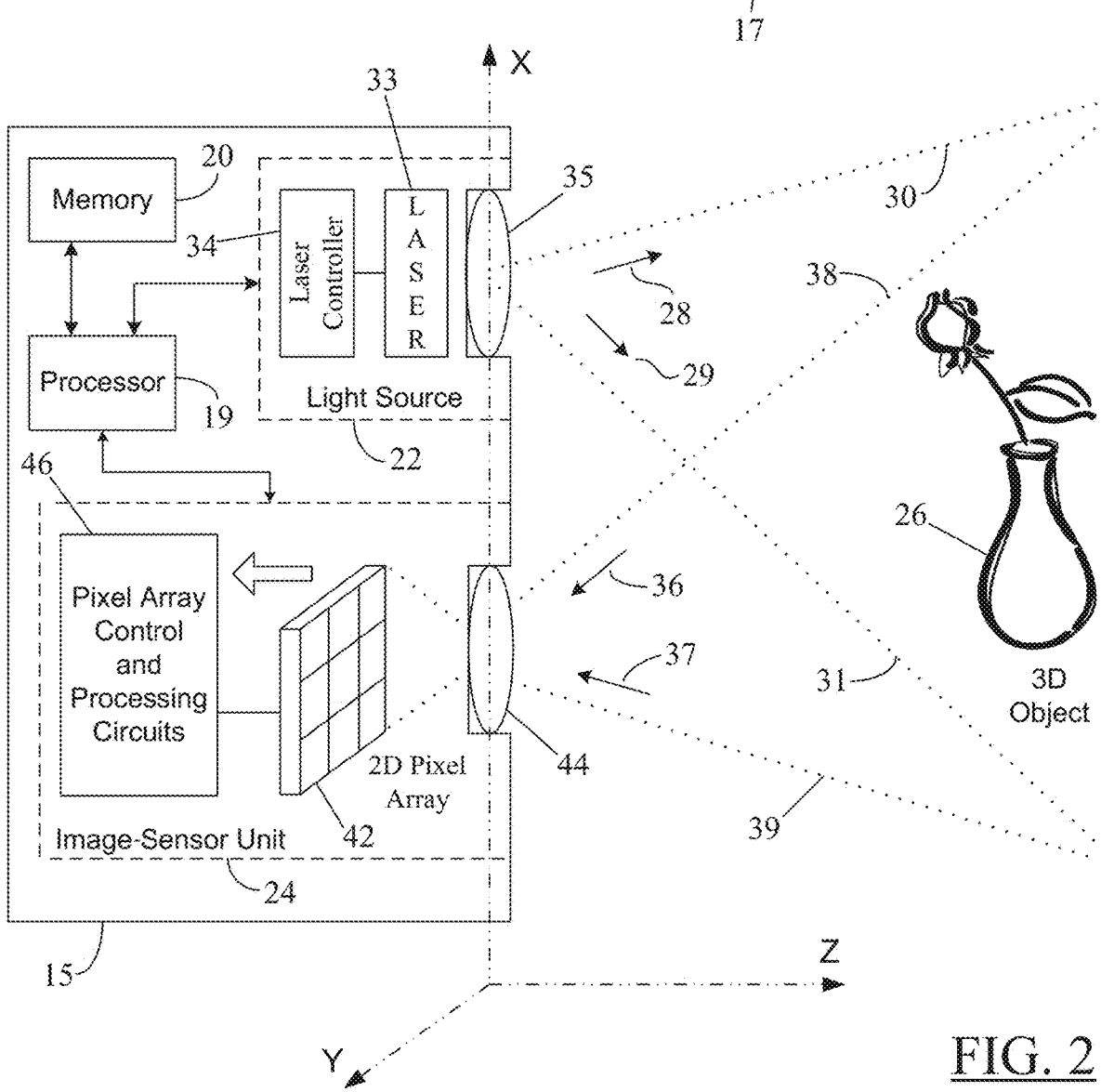
FIG. 2 illustrates an exemplary operational configuration of the system in FIG. 1 according to one embodiment disclosed herein.

In particular embodiments disclosed herein, the imaging module 17 may include a light source 22 and an image-sensor unit 24. As discussed in more detail with reference to FIG. 2 below, in one embodiment, the light source 22 may be a visible laser. In other embodiments, the light source may be an NIR laser. The image-sensor unit 24 may include a pixel array and ancillary processing circuits as shown in FIG. 2 and also discussed below.

In one embodiment, the processor 19 may be a CPU, which can be a general-purpose microprocessor. In the discussion herein, the terms "processor" and "CPU" may be used interchangeably for ease of discussion. It is, however, understood that, instead of or in addition to the CPU, the processor 19 may contain any other type of processor such as, but not limited to, a microcontroller, a Digital Signal Processor (DSP), a Graphics Processing Unit (GPU), a dedicated Application Specific Integrated Circuit (ASIC) processor, and the like. Furthermore, in one embodiment, the processor/host 19 may include more than one CPU, which may be operative in a distributed processing environment. The processor 19 may be configured to execute instructions and to process data according to a particular Instruction Set Architecture (ISA) such as, but not limited to, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 19 may be a System on Chip (SoC) having functionalities in addition to a CPU functionality.

In particular embodiments, the memory module 20 may be a Dynamic Random Access Memory (DRAM) such as, but not limited to, a Synchronous DRAM (SDRAM), or a DRAM-based Three-Dimensional Stack (3DS) memory module such as, but not limited to, a High Bandwidth Memory (HBM) module, or a Hybrid Memory Cube (HMC) memory module.

In other embodiments, the memory module 20 may be a Solid-State Drive (SSD), a non-3DS DRAM module, or any other semiconductor-based storage system such as, but not limited to, a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), a Spin-Transfer Torque MRAM (STT-MRAM), and the like.

FIG. 2 illustrates an exemplary operational configuration of the system 15 in FIG. 1 according to one embodiment disclosed herein. The system 15 may be used to obtain depth information (along the Z-axis) for a 3D object, such as the 3D object 26, which may be an individual object or an object within a scene (not shown). In one embodiment, the depth information may be calculated by the processor 19 based on the scan data received from the image-sensor unit 24. In another embodiment, the depth information may be calculated by the image-sensor unit 24 itself such as, in case of the image-sensor unit in the embodiment of FIG. 7A. In particular embodiments, the depth information may be used by the processor 19 as part of a 3D user interface to enable the user of the system 15 to interact with the 3D image of the object or use the 3D image of the object as part of a game or another application running on the system 15. The 3D imaging as per the subject matter disclosed herein may be used for other purposes or applications as well, and may be applied to substantially any scene or 3D objects.

In FIG. 2, the X-axis is taken to be the horizontal direction along the front of the device 15, the Y-axis is the vertical direction (out of the page in this view), and the Z-axis extends away from the device 15 in the general direction of the object 26 being imaged. For the depth measurements, the optical axes of the modules 22 and 24 may be parallel to the Z-axis. Other optical arrangements may be used as well to implement the principles described herein, and these alternative arrangements are considered to be within the scope of the subject matter disclosed herein.

The light-source module 22 may illuminate the 3D object 26 as shown by exemplary arrows 28 and 29 associated with corresponding dotted lines 30 and 31 representing an illumination path of a light beam or optical radiation that may be used to point scan the 3D object 26 within an optical field of view. A line-by-line point scan of the object surface may be performed using an optical-radiation source, which, in one embodiment, may be a laser-light source 33 operated and controlled by a laser controller 34. A light beam from the laser source 33 may be point scanned, under the control of the laser controller 34, in the X-Y direction across the surface of the 3D object 26 via projection optics 35. The point scan may project light spots on the surface of the 3D object along a scan line, as discussed in more detail with reference to FIGS. 4 and 5 below. The projection optics may be a focusing lens, a glass/plastics surface, or other cylindrical optical element that concentrates laser beam from the laser 33 as a point or spot on that surface of the object 26. In the embodiment of FIG. 2, a convex structure is shown as a focusing lens 35. Any other suitable lens design, however, may be selected for projection optics 35. The object 26 may be placed at a focusing location where illuminating light from the light source 33 is focused by the projection optics 35 as a light spot. Thus, in the point scan, a point or narrow area/spot on the surface of the 3D object 26 may be illuminated sequentially by the focused light beam from the projection optics 35.

In particular embodiments, the light source (or illumination source) 33 may be a diode laser or a Light Emitting Diode (LED) emitting visible light, an NIR laser, a point light source, a monochromatic illumination source (such as, a combination of a white lamp and a monochromator) in the visible light spectrum, or any other type of laser light source. The laser 33 may be fixed in one position within the housing of the device 15, but may be rotatable in X-Y directions. The laser 33 may be X-Y addressable (for example, by the laser controller 34) to perform point scan of the 3D object 26. In one embodiment, the visible light may be substantially green light. The visible light illumination from the laser source 33 may be projected onto the surface of the 3D object 26 using a mirror (not shown), or the point scan may be completely mirrorless. In particular embodiments, the light-source module 22 may include more or less components than those shown in the exemplary embodiment of FIG. 2.

In the embodiment of FIG. 2, the light reflected from the point scan of the object 26 may travel along a collection path indicated by arrows 36 and 37 and dotted lines 38 and 39. The light collection path may carry photons reflected from or scattered by the surface of the object 26 upon receiving illumination from the laser source 33. It is noted here that the depiction of various propagation paths using solid arrows and dotted lines in FIG. 2 (and also in FIGS. 4 and 5, as applicable) is for illustrative purpose only. The depiction should not be construed to illustrate any actual optical signal propagation paths. In practice, the illumination and collection signal paths may be different from those shown in FIG. 2, and may not be as clearly-defined as in the illustration in FIG. 2.

The light received from the illuminated object 26 may be focused onto one or more pixels of a 2D pixel array 42 via collection optics 44 in the image-sensor unit 24. Like the projection optics 35, the collection optics 44 may be a focusing lens, a glass/plastics surface, or other cylindrical optical element that concentrates the reflected light received from the object 26 onto one or more pixels in the 2D array 42. In the embodiment of FIG. 2, a convex structure is shown as a focusing lens 44. Any other suitable lens design may, however, be selected for collection optics 44. Furthermore, for ease of illustration, only a 3×3 pixel array is shown in FIG. 2 (and also in FIG. 6). It is understood, however, that modern pixel arrays contain thousands or even millions of pixels. The pixel array 42 may be an RGB pixel array in which different pixels may collect light signals of different colors. As mentioned before, in particular embodiments, the pixel array 42 may be any 2D sensor, such as a 2D RGB sensor with IR cut filter, a 2D IR sensor, a 2D NIR sensor, a 2D RGBW sensor, a 2D RGB-IR sensor, and the like. As discussed in more detail later, the system 15 may use the same pixel array 42 for 2D RGB color imaging of the object 26 (or a scene containing the object) as well as for 3D imaging (involving depth measurements) of the object 26. Additional architectural details of the pixel array 42 are discussed later with reference to FIG. 6.

Figure 7A:
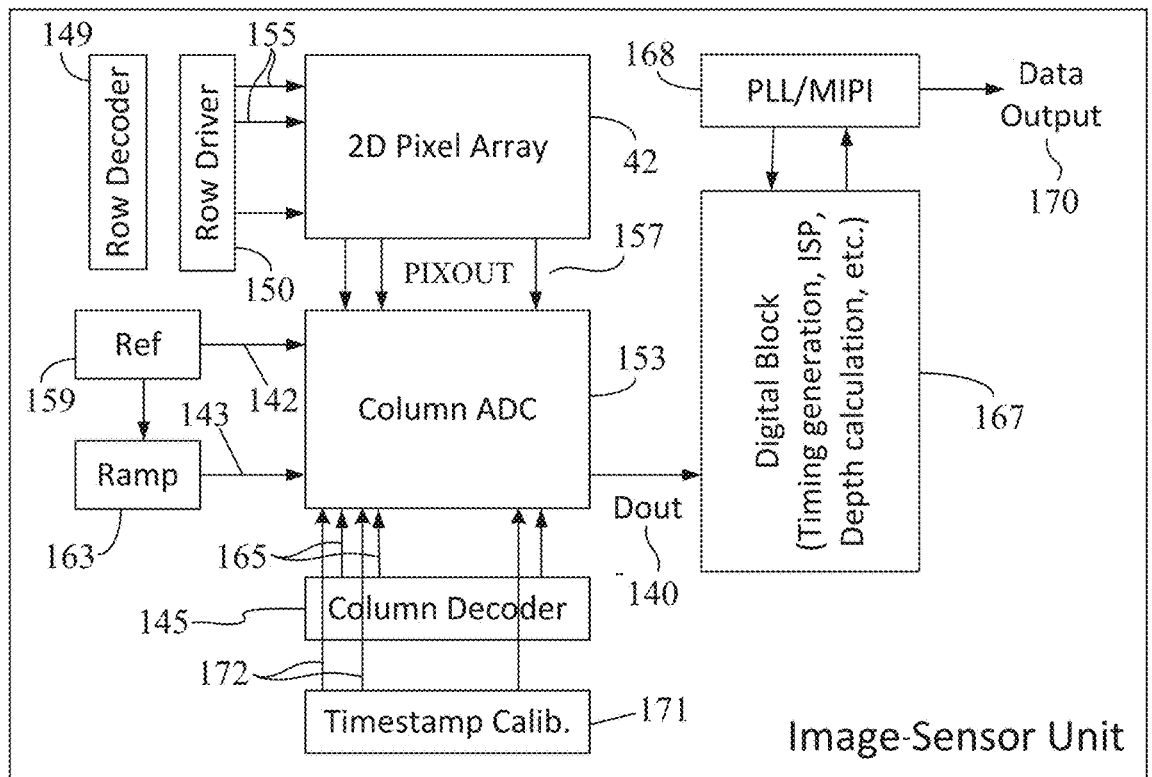
FIG. 7A is an exemplary configuration of an image-sensor unit according to one embodiment disclosed herein.
Figure 7B:
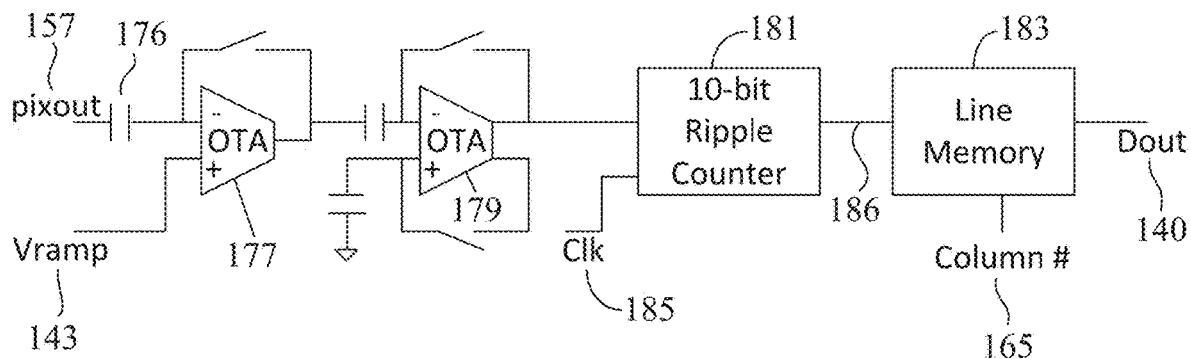
FIG. 7B shows architectural details of an exemplary CDS+ADC unit for 3D-depth measurement according to one embodiment disclosed herein.

The pixel array 42 may convert the received photons into corresponding electrical signals, which are then processed by the associated image processing unit 46 to determine the 3D-depth image of the object 26. In one embodiment, the image processing unit 46 may use triangulation for depth measurements. The triangulation approach is discussed later with reference to FIG. 4. The image processing unit 46 may also include relevant circuits for controlling the operation of the pixel array 42. Exemplary image processing and control circuits are illustrated in FIGS. 7A and 7B, which are discussed later below.

The processor 19 may control the operations of the light-source module 22 and the image-sensor unit 24. For example, the system 15 may have a mode switch (not shown) controllable by the user to switch from 2D-imaging mode to 3D-imaging mode. If the user selects the 2D-imaging mode using the mode switch, the processor 19 may activate the image-sensor unit 24, but may not activate the light-source module 22 because 2D imaging may use ambient light. On the other hand, if the user selects 3D imaging using the mode switch, the processor 19 may activate both of the modules 22 and 24, and may also trigger change in the level of the Reset (RST) signal in the image processing unit 46 to switch from a linear mode to a logarithmic mode of imaging, for example, if the ambient light is too strong to be rejected by linear mode (as discussed below). The processed image data received from the image processing unit 46 may be stored by the processor 19 in the memory 20. The processor 19 may also display the user-selected 2D or 3D image on a display screen (not shown) of the device 15. The processor 19 may be programmed in software or firmware to carry out various processing tasks described herein. Alternatively or additionally, the processor 19 may comprise programmable hardware logic circuits for carrying out some or all of the functions of processor 19. In particular embodiments, the memory 20 may store program code, look-up tables (like the one shown in FIG. 9 and discussed later), and/or interim computational results to enable the processor 19 to carry out the functions of processor 19.

Figure 3:
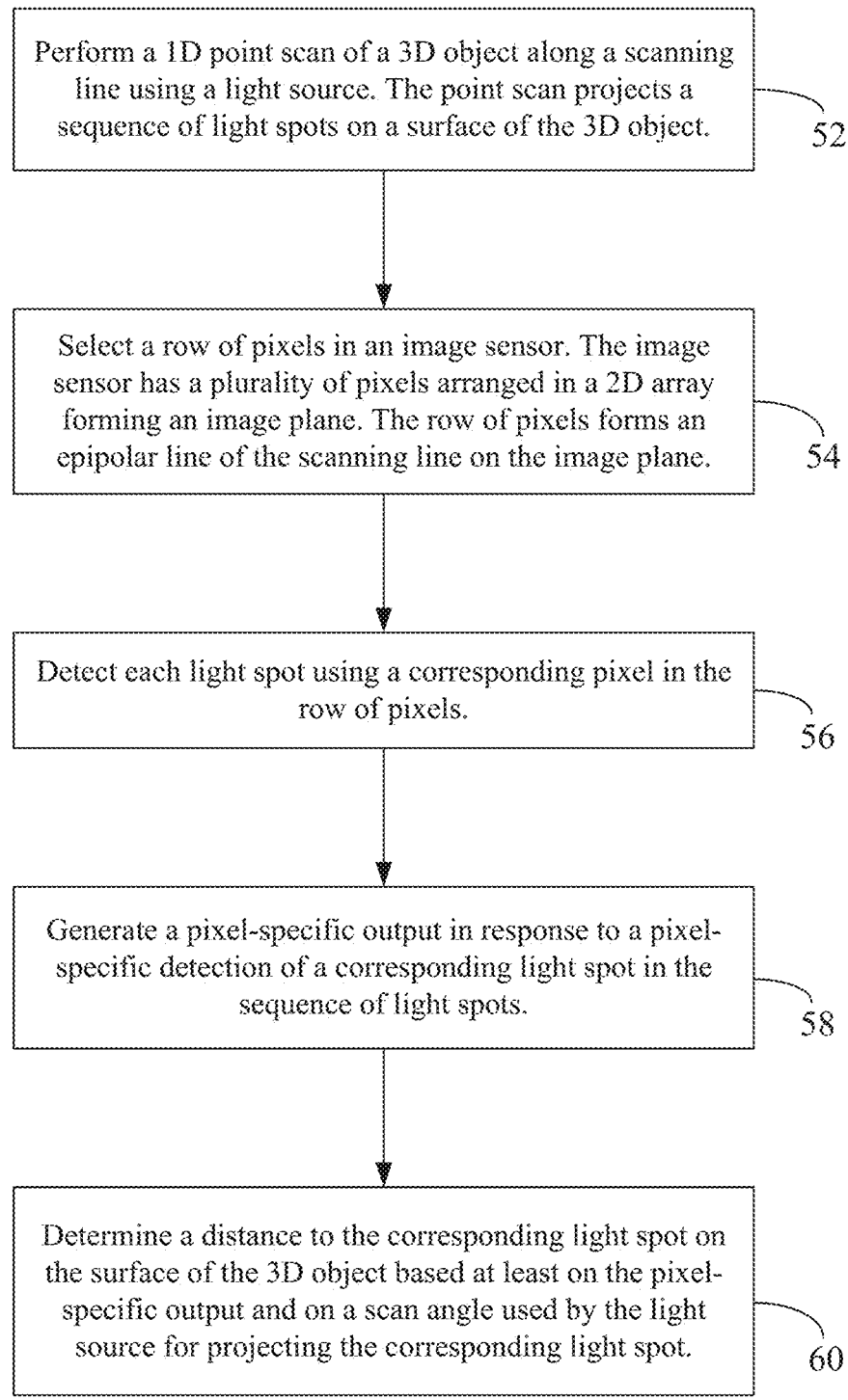
FIG. 3 depicts an exemplary flowchart showing how 3D-depth measurements may be performed according to one embodiment disclosed herein.

FIG. 3 depicts an exemplary flowchart 50 showing how 3D-depth measurements may be performed according to one embodiment disclosed herein. Various operations illustrated in FIG. 3 may be performed by a single module or a combination of modules or system components in the system 15. In the discussion herein, by way of an example only, specific tasks are described as being performed by specific modules or system components. Other modules or system components may be suitably configured to perform such tasks as well.

In FIG. 3, at block 52, the system 15 (more specifically, the processor 19) may perform a one-dimensional (1D) point scan of a 3D object, such as the object 26 in FIG. 2, along a scanning line using a light source, such as the light-source module 22 in FIG. 2. As part of the point scan, the light-source module 22 may be configured, for example, by the processor 19, to project a sequence of light spots on a surface of the 3D object 26 in a line-by-line manner. At block 54, the pixel processing unit 46 in the system 15 may select a row of pixels in an image sensor, such as the 2D pixel array 42 in FIG. 2. The image sensor 42 has a plurality of pixels arranged in a 2D array forming an image plane, the selected row of pixels forms an epipolar line of the scanning line (at block 52) on the image plane. A brief discussion of epipolar geometry is provided below with reference to FIG. 4. At block 56, the pixel processing unit 46 may be operatively configured by the processor 19 to detect each light spot using a corresponding pixel in the row of pixels. It is observed here that light reflected from an illuminated light spot may be detected by a single pixel or more than one pixel, such as if the light reflected from the illuminated spot becomes focused by the collection optics 44 onto two or more adjacent pixels. On the other hand, it may be possible that light reflected from two or more light spots may be collected at a single pixel in the 2D array 42. A timestamp-based approach discussed below removes depth calculation-related ambiguities resulting from imaging of two different spots by the same pixel or imaging of a single spot by two different pixels. At block 58, the image processing unit 46—as suitably configured by the processor 19—may generate a pixel-specific output in response to a pixel-specific detection (at block 56) of a corresponding light spot in the sequence of light spots (in the point scan at block 52). Consequently, at block 60, the image processing unit 46 may determine the 3D distance (or depth) to the corresponding light spot on the surface of the 3D object based at least on the pixel-specific output (at block 58) and on a scan angle used by the light source for projecting the corresponding light spot (at block 52). The depth measurement is discussed in more detail with reference to FIG. 4.

Figure 4:
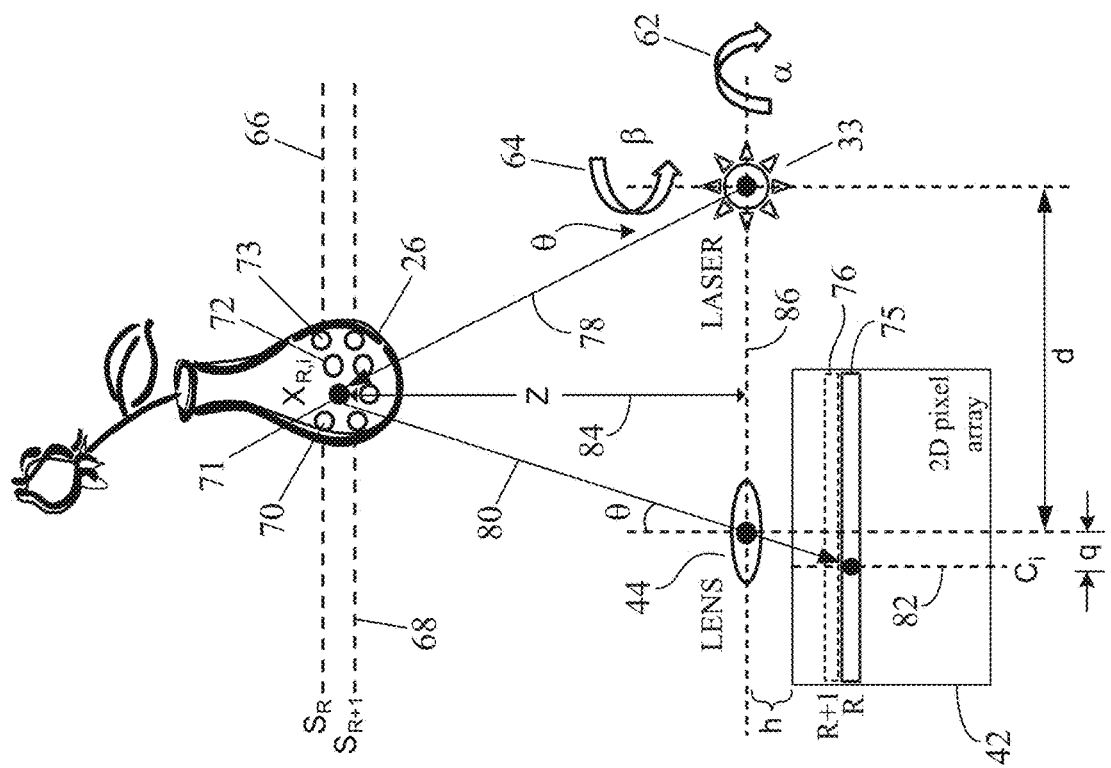
FIG. 4 is an exemplary illustration of how a point scan may be performed for 3D-depth measurements according to one embodiment disclosed herein.

FIG. 4 is an exemplary illustration of how a point scan may be performed for 3D-depth measurements according to one embodiment disclosed herein. In FIG. 4, the X-Y rotational capabilities of the laser source 33 are illustrated using the arrows 62 and 64 depicting the angular motions of a laser in the X-direction (having angle "β") and in the Y-direction (having angle "α"). In one embodiment, the laser controller 34 may control the X-Y rotation of the laser source 33 based on scanning instructions/input received from the processor 19. For example, if a user selects 3D-imaging mode, the processor 19 may instruct the laser controller 34 to initiate 3D-depth measurements of the object surface facing the projection optics 35. In response, the laser controller 34 may initiate a 1D X-Y point scan of the object surface through X-Y movement of the laser light source 33. As shown in FIG. 4, the laser 33 may point scan the surface of the object 26 by projecting light spots along 1D horizontal scanning lines—two of which $S_R$ 66 and $S_{R+1}$ 68 are identified by dotted lines in FIG. 4. Because of the curvature of the surface of the object 26, the light spots 70-73 may form the scanning line $S_R$ 66 in FIG. 4. For ease of illustration and clarity, the light spots constituting the scan line $S_{R+1}$ 68 are not identified using reference numerals. The laser 33 may scan the object 26 along rows R, R+1, and so on, for example, one spot at a time in a left-to-right direction. The values of R, R+1, and so on, are with reference to rows of pixels in the 2D pixel array 42 and, hence, these values are known. For example, in the 2D pixel array 42 in FIG. 4, the pixel row R is identified using reference numeral "75" and the row R+1 is identified using reference numeral "76." It is understood that rows R and R+1 are selected from the plurality of rows of pixels for illustrative purpose only.

The plane containing the rows of pixels in the 2D pixel array 42 may be called the image plane, whereas the plane containing the scanning lines, such as the lines $S_R$ and $S_{R+1}$, may be called the scanning plane. In the embodiment of FIG. 4, the image plane and the scanning plane are oriented using epipolar geometry such that each row of pixels R, R+1, and so on, in the 2D pixel array 42 forms an epipolar line of the corresponding scanning line $S_R$, $S_{R+1}$, and so on. A row of pixels R may be considered epipolar to a corresponding scanning line $S_R$ if a projection of an illuminated spot (in the scanning line) onto the image plane may form a distinct spot along a line that is the row R itself. For example, in FIG. 4, the arrow 78 illustrates the illumination of the light spot 71 by the laser 33, whereas the arrow 80 shows that the light spot 71 is being imaged or projected along the row R 75 by the focusing lens 44. Although not shown in FIG. 4, it is observed that all of the light spots 70-73 will be imaged by corresponding pixels in the row R. Thus, in one embodiment, the physical arrangement, such as the position and orientation, of the laser 33 and the pixel array 42 may be such that illuminated light spots in a scanning line on the surface of the object 26 may be captured or detected by pixels in a corresponding row in the pixel array 42—that row of pixels thus forming an epipolar line of the scanning line.

It is understood that the pixels in the 2D pixel array 42 may be arranged in rows and columns. An illuminated light spot may be referenced by the corresponding row and column in the pixel array 42. For example, in FIG. 4, the light spot 71 in the scanning line $S_R$ is designated as $X_{R,i}$ to indicate that the spot 71 may be imaged by row R and column i ($C_i$) in the pixel array 42. The column $C_i$ is indicated by dotted line 82. Other illuminated spots may be similarly identified. As noted before, it may be possible that light reflected from two or more lights spots may be received by a single pixel in a row, or, alternatively, light reflected from a single light spot may be received by more than one pixel in a row of pixels. The timestamp-based approach discussed later may remove the ambiguities in depth calculations arising from such multiple or overlapping projections.

In the illustration of FIG. 4, the arrow having reference numeral "84" represents the depth or distance Z (along the Z-axis) of the light spot 71 from the X-axis along the front of the device 15, such as the X-axis shown in FIG. 2. In FIG. 4, a dotted line having the reference numeral "86" represents such an axis, which may be visualized as being contained in a vertical plane that also contains the projection optics 35 and the collection optics 44. For ease of explanation of the triangulation method, however, the laser source 33 is shown in FIG. 4 as being on the X-axis 86 instead of the projection optics 35. In a triangulation-based approach, the value of Z may be determined using the following equation:

$$Z = \frac{hd}{q - h\tan\theta}. \tag{1}$$

The parameters in the above Equation (1) are also shown in FIG. 4. Based on the physical configuration of the device 15, the values for the parameters on the right side of Equation (1) may be pre-determined. In Equation (1), the parameter h is the distance (along the Z-axis) between the collection optics 44 and the image sensor 42 (which is assumed to be in a vertical plane behind the collection optics 44); the parameter d is the offset distance between the light source 33 and the collection optics 44 associated with the image sensor 24; the parameter q is the offset distance between the collection optics 44 and a pixel that detects the corresponding light spot (in the example of FIG. 4, the detecting/imaging pixel i is represented by column $C_i$ associated with the light spot $X_{R,i}$ 71); and the parameter θ is the scan angle or beam angle of the light source for the light spot under consideration (in the example of FIG. 4, the light spot 71). Alternatively, the parameter q may also be considered as the offset of the light spot within the field of view of the pixel array 42.

It is seen from Equation (1) that only the parameters θ and q are variable for a given point scan; the other parameters h and d are essentially fixed due to the physical geometry of the device 15. Because the row R 75 is an epipolar line of the scanning line $S_R$, the depth difference or depth profile of the object 26 may be reflected by the image shift in the horizontal direction, as represented by the values of the parameter q for different lights spots being imaged. As discussed later below, the timestamp-based approach according to particular embodiments disclosed herein may be used to find the correspondence between the pixel location of a captured light spot and the corresponding scan angle of the laser source 33. In other words, a timestamp may represent an association between the values of parameters q and θ. Thus, from the known value of the scan angle θ and the corresponding location of the imaged light spot (as represented by the parameter q), the distance Z to that light spot may be determined using the triangulation Equation (1).

It is observed here that usage of triangulation for distance measurements is described in the relevant literature including, for example, the U.S. Patent Application Publication No. 2011/0102763 A1 to Brown et al. (Brown). The discussion in the Brown publication related to triangulation-based distance measurement is incorporated herein by reference in its entirety.

Figure 5:
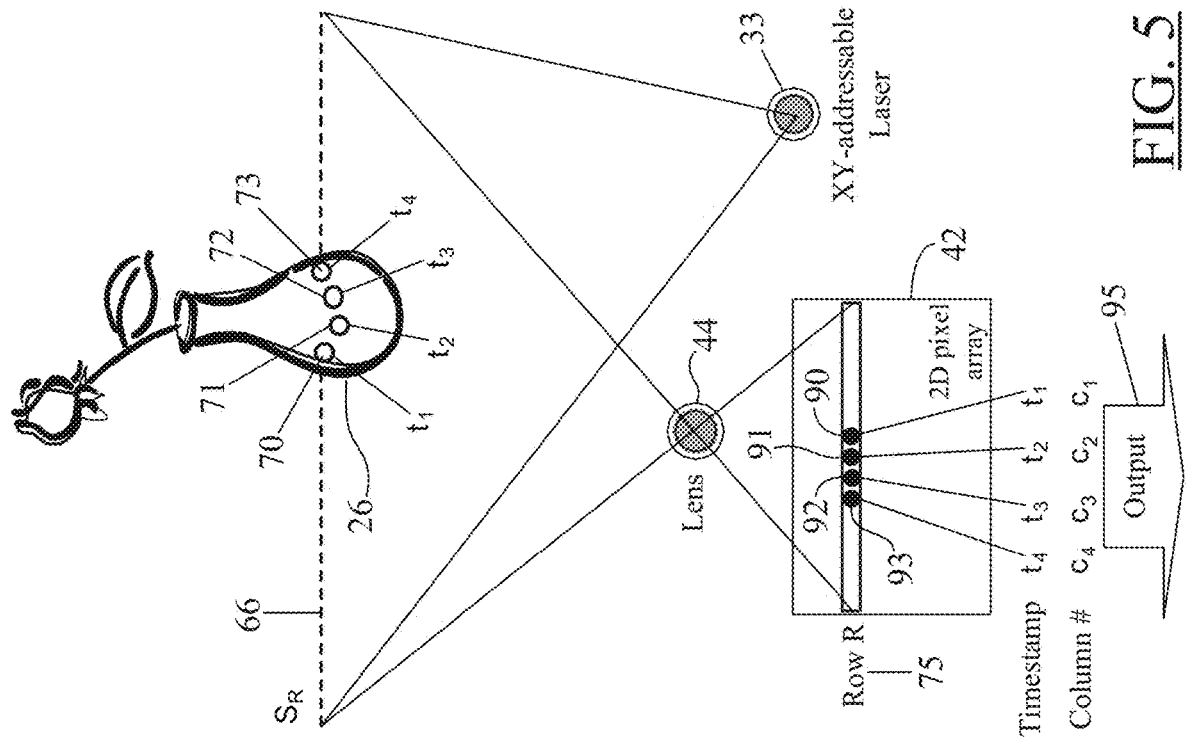
FIG. 5 illustrates an exemplary timestamping for scanned light spots according to one embodiment disclosed herein.

FIG. 5 illustrates an exemplary timestamping for scanned light spots according to one embodiment disclosed herein. Additional details of generation of individual timestamps are provided later, such as with reference to discussion of FIG. 8. In contrast to FIG. 4, in the embodiment of FIG. 5, the collection optics 44 and the laser 33 are shown in an offset arrangement to reflect the actual physical geometry of these components as shown in the embodiment of FIG. 2. By way of an example, the scanning line 66 is shown in FIG. 5 along with corresponding light spots 70-73, which, as mentioned before, may be projected based on a left-to-right point scan of the object surface by the sparse laser point source 33. Thus, as shown, the first light spot 70 may be projected at time instant $t_1$, the second light spot 71 may be projected at time instant $t_2$, and so on. These light spots may be detected/imaged by respective pixels 90-93 in the pixel row R 75, which is an epipolar line of the scanning line $S_R$ as discussed earlier. In one embodiment, the charge collected by each pixel if detecting a light spot may be in the form of an analog voltage, which may be output to the image processing unit 46 for pixel-specific depth determination as discussed below. The analog pixel outputs (pixouts) are collectively indicated by arrow 95 in FIG. 5.

As shown in FIG. 5, each detecting pixel 90-93 in row R may have an associated column number—here, columns $C_1$ through $C_4$. Furthermore, it is seen from FIG. 4 that each pixel column $C_i$ (i=1, 2, 3, and so on) has an associated value for the parameter q in Equation (1). Thus, if a pixel-specific timestamp $t_1$-$t_4$ is generated for the detecting pixels 90-93 (as discussed in more detail later below), the timestamp may provide an indication of the column number of the pixel and, hence, the pixel-specific value of the parameter q. Additionally, in one embodiment, the spot-by-spot detection using pixels in the pixel array 42 may allow the image processing unit 46 to "link" each timestamp with the corresponding illuminated spot and, hence, with the spot-specific scan angle θ because the laser 33 may be suitably controlled to illuminate each spot in the desired sequence with pre-determined values for spot-specific scan angles θ. Thus, timestamps provide correspondence between the pixel location of a captured laser spot and a respective scan angle in the form of the values for parameters q and θ in Equation (1) for each pixel-specific signal received from the pixel array 42. As discussed before, the values of the scan angle and the corresponding location of the detected spot in the pixel array 42, as reflected through the value of the parameter q in Equation (1), may allow depth determination for that light spot. In this manner, the 3D-depth map for the surface of the object 26 in the field of view of the pixel array 42 may be generated.

FIG. 6 shows exemplary circuit details of the 2D pixel array 42 and a portion of the associated processing circuits in the image processing unit 46 of the image sensor 24 in FIGS. 1 and 2 according to one embodiment disclosed herein. As noted before, the pixel array 42 is shown having nine pixels 100-108 arranged as a 3×3 array for ease of illustration only; in practice, a pixel array may contain hundreds of thousands or millions of pixels in multiple rows and columns. In one embodiment, each pixel 100-108 may have an identical configuration as shown in FIG. 6. In the embodiment of FIG. 6, the 2D pixel array 42 comprises a Complementary Metal Oxide Semiconductor (CMOS) array in which each pixel is a Four Transistor Pinned Photo-diode (4T PPD) pixel. For ease of illustration, the constituent circuit elements of only pixel 108 are labeled with reference numerals. The following discussion of the operation of the pixel 108 equally applies to the other pixels 101-107 and, hence, the operation of each individual pixel is not described herein.

As shown, the 4T PPD pixel 108 (and similar other pixels 101-107) may comprise a pinned photo-diode (PPD) 110 and four N-channel Metal Oxide Semiconductor Field Effect Transistors (NMOS) 111-114 connected as illustrated. The transistor 111 may operate as a Transfer Gate (TG), Floating Diffusion (FD) transistor. Broadly, the 4T PPD pixel 108 may operate as follows: First, the PPD 110 may convert the incident photons into electrons, thereby converting the optical input signal into an electrical signal in the charge domain. Then, the transfer gate 111 may be "closed" to transfer all the photon-generated electrons from the PPD 110 to the floating diffusion. The signal in the charge domain thus is converted to the voltage domain for ease of subsequent processing and measurements. The voltage at the floating diffusion may be later transferred as a pixout signal to an Analog-to-Digital Converter (ADC) using the transistor 114 and converted into an appropriate digital signal for subsequent processing. More details of the pixel output (PIXOUT) generation and processing are provided below with reference to discussion of FIGS. 8, 10 and 11.

In the embodiment of FIG. 6, a row decoder/driver 116 in the image processing unit 46 is shown to provide three different signals to control the operation of the pixels in the pixel array 42 to generate the column-specific pixout signals 117-119. In the embodiment of FIG. 5, the output 95 may collectively represent such PIXOUT signals 117-119. A Row Select (RSEL) signal may be asserted to select an appropriate row of pixels. In one embodiment, the row to be selected is the epipolar line of the current scanning line (of light spots) being projected by the laser source 33. The row decoder/driver 116 may receive the address or control information for the row to be selected via the row address/control inputs 126, for example, from the processor 19. In the present discussion, it is assumed that the row decoder/driver 116 selects the row of pixels containing the pixel 108. A transistor, such as the transistor 114, in each row of pixels in the pixel array 42 may be connected to a respective RSEL line 122-124 as shown. A Reset (RST) signal may be applied to pixels in the selected row to reset those pixels to a pre-determined high voltage level. Each row-specific RST signal 128-130 is shown in FIG. 6 and explained in more detail with reference to the waveforms in FIGS. 8, 10 and 11. A transistor, such as the transistor 112, in each pixel may receive the respective RST signal as shown. A Transfer (TX) signal may be asserted to initiate transfer of the pixel-specific output voltage (PIXOUT) for subsequent processing. Each row-specific TX line 132-134 is shown in FIG. 6. A transfer-gate transistor, such as the transistor 111, may receive the respective TX signal as illustrated in FIG. 6.

As mentioned before, in particular embodiments disclosed herein, the 2D array 42 and the rest of the rest of the components in the image-sensor unit 24 may be used for 2D RGB (or non-RGB) imaging as well as for 3D-depth measurements. Consequently, as shown in FIG. 6, the image-sensor unit 24 may include a pixel column unit 138 that includes circuits for Correlated Double Sampling (CDS) as well as column-specific ADCs—one ADC per column of pixels—to be used during 2D and 3D imaging. The pixel column unit 138 may receive and process the PIXOUT signals 117-119 to generate a digital data output (Dout) signal 140 from which a 2D image may be generated or a 3D-depth measurements can be obtained. The pixel column unit 138 may also receive a reference input 142 and a ramp input 143 during processing of the PIXOUT signals 117-119. More details of the operation of the unit 138 are provided later below. In the embodiment of FIG. 6, a column decoder unit 145 is shown coupled to the pixel column unit 138. The column decoder 145 may receive a column address/control input 147 from, for example, the processor 19, for the column to be selected in conjunction with a given row select (RSEL) signal. The column selection may be sequential, thereby allowing sequential reception of the pixel output from each pixel in the row selected by the corresponding RSEL signal. The processor 19 may be aware of the currently projected scanning line of light spots and, hence, may provide appropriate row address inputs to select the row of pixels that forms the epipolar line of the current scanning line and may also provide appropriate column address inputs to enable the pixel column unit 138 to receive outputs from the individual pixels in the selected row.

Although the discussion herein primarily focuses on the 4T PPD pixel design shown in FIG. 6 for 2D and 3D imaging according to the subject matter disclosed herein, different types of pixels may be used in the pixel array 42 in other embodiments. For example, in one embodiment, each pixel in the pixel array 42 may be a 3T pixel, which omits the transfer gate transistor, like the transistor 111 in the 4T PPD design in FIG. 6. In other embodiments, 1T pixels or 2T pixels may be used as well. In yet another embodiment, each pixel in the pixel array 42 may have a shared-transistor pixel configuration in which transistors and read-out circuitry can be shared among two or more neighboring pixels. In the shared-transistor pixel configuration, each pixel may have at least one photo-diode and one transfer-gate transistor; the rest of the transistors can be shared among two or more pixels. One example of such a shared-transistor pixel is the 2-shared (1×2) 2.5T pixel in which five transistors (T) are used for two pixels, resulting in a 2.5T/pixel configuration. Another example of a shared-transistor pixel that may be used in the pixel array 42 is the 1×4 4-shared pixel in which 4 pixels share the readout circuitry, but each pixel has at least one photo-diode and one TX (transfer-gate) transistor. Other pixel configurations than those listed here may be suitably implemented for 2D and 3D imaging as per the subject matter disclosed herein.

FIG. 7A is an exemplary configuration of an image-sensor unit, such as the image-sensor unit 24 in FIG. 6, according to one embodiment disclosed herein. For the sake of brevity, only a brief discussion of the architecture in FIG. 7A is provided herein; more relevant operational details are provided later with reference to FIGS. 8, 10 and 11. As shown, the image-sensor unit 24 in FIG. 7A may include a row decoder unit 149 and a row driver unit 150, both of which collectively comprise the row decoder/driver 116 in FIG. 6. Although not shown in FIG. 7A, the row decoder unit 149 may receive a row address input (like the input 126 shown in FIG. 6) from, for example, the processor 19, and decode the input to enable the row driver unit 150 to provide appropriate RSEL, RST, and TX signals to the row selected/decoded by the row decoder 149. The row driver unit 150 may also receive control signals (not shown) from, for example, the processor 19, to configure the row driver 150 to apply appropriate voltage levels for the RSEL, RST, and TX signals. In the image-sensor unit 24 in FIG. 7A, a column ADC unit 153 may represent the pixel column unit 138 in FIG. 6. For ease of illustration, in FIG. 7A, various row-specific driver signals, such as the RSEL, RST, and TX signals, from the row driver 150 are collectively referenced using a single reference numeral "155." Similarly, all column-specific pixel outputs (PIXOUTS), like the PIXOUT signals 117-119 in FIG. 6, are collectively referenced using a single reference numeral "157." The column ADC unit 153 may receive the PIXOUT signals 157 and the reference input 142 (from a reference signal generator 159) and the ramp signal 143 to generate a pixel-specific output by the corresponding column-specific ADC for the column of the pixel. The 2D imaging is discussed in more detail later with reference to FIG. 10. In one embodiment, the ADC unit 153 may include circuitry for CDS, as in case of the pixel column unit 138 in FIG. 6, to generate a CDS output (not shown) that is the difference between the reset level of the pixel and the received signal level. In particular embodiments, the 3D-depth values may be combined with the 2D image to generate a 3D image of the object.

The column ADC unit 153 may include a separate ADC per pixel column in the 2D array 42. Each column-specific ADC may receive a respective ramp input 143 (from a ramp signal generator 163) along with the PIXOUT signals 157. In one embodiment, the ramp signal generator 163 may generate the ramp input 143 based on the reference voltage level received from the reference signal generator 159. Each column-specific ADC in the ADC unit 153 may process the received inputs to generate the corresponding digital data output (Dout) signal 140. The ADC unit 153 may receive information from the column decoder 145 about which column ADC output to be readout and sent to the Dout bus 140, and may also receive information about which column to select for a given row to receive the appropriate pixel output. Although not shown in FIG. 7A, the column decoder unit 145 may receive a column address input (like the input 147 in FIG. 6) from, for example, the processor 19, and decode the input to enable the column ADC unit 153 to select the appropriate pixel column. In the embodiment of FIG. 7A, the decoded column address signals are collectively identified using the reference numeral "165."

The digital data outputs 140 from the ADC units may be processed by a digital processing block 167. In one embodiment, for the 2D RGB imaging mode, each ADC-specific data output 140 may be a multi-bit digital value that substantially corresponds to the actual photon charge collected by the respective pixel. On the other hand, in the 3D-depth measurement mode, each ADC-specific data output 140 may be a timestamp value representing the time instant when the respective pixel detects the corresponding light spot. This timestamping approach according to the subject matter disclosed herein is discussed later in more detail. The digital processing block 167 may include circuits to provide timing generation; Image Signal Processing (ISP), such as processing of data outputs 140 for the 2D-imaging mode; depth calculations for the 3D-imaging mode; and so on. In that regard, the digital processing block 167 may be coupled to an interface unit 168 to provide the processed data as an output 170, for example, to enable the processor 19 to render a 2D RGB/non-RGB image or a 3D-depth image of the 3D object 26 on a display screen (not shown) of the device 15. The interface unit 168 may include a Phase-Locked Loop (PLL) unit for generation of clock signals that support the timing generation functionality in the digital processing block 167. Furthermore, the interface unit 168 may also include a Mobile Industry Processor Interface (MIPI) that provides an industry-standard hardware and software interface to other components or circuit elements in the device 15 for the data generated by the digital block 167. The MIPI specifications support a broad range of mobile products and provide specifications for a camera of a mobile device, display screen, power management, battery interface, and the like. The MIPI-standardized interfaces may yield an improved operability between a peripherals of a mobile device, such as a camera or display screen of a smartphone, and the application processor(s) of the mobile device, which may not be from the same vendor as the vendor (or vendors) providing the peripherals.

In the embodiment of FIG. 7A, a timestamp calibration unit 171 is shown coupled to the column ADC unit 153 to provide appropriate calibration signals 172 to individual column-specific ADCs to enable each column-specific ADC unit to generate an output representing a pixel-specific timestamp value in the 3D-measurement mode. This timestamping approach is discussed in more detail with reference to FIG. 8.

FIG. 7B shows architectural details of an exemplary CDS+ADC unit 175 for 3D-depth measurement according to one embodiment disclosed herein. For ease of discussion, the unit 175 may be referred below to as "ADC unit," however, it is understood that the unit 175 may also include CDS functionality in addition to the ADC functionality. A simplified version of a CDS unit is represented using the capacitor 176 in FIG. 7B. In one embodiment, each column of pixels in the 2D pixel array 42 may have a column-specific, single-slope ADC unit similar to the ADC unit 175. Thus, in the embodiment of FIG. 6, there may be three ADC units in the pixel column unit 138, i.e., one ADC per column. As shown, the ADC 175 in the embodiment of FIG. 7B may include two Operational Transconductance Amplifiers (OTA) 177 and 179 connected in series with a binary counter 181 and a line memory unit 183. For ease of illustration, only the inverting (−) and non-inverting (+) voltage inputs to the OTAs 177 and 179 are shown in FIG. 7B, and the biasing inputs and the power supply connections are not shown. It is understood that an OTA is an amplifier in which a differential input voltage produces an output current. Thus, an OTA may be considered as a voltage-controlled current source. The biasing inputs may be used to provide currents or voltages to control the transconductance of the amplifier. The first OTA 177 may receive from the CDS unit 176 a CDS version of the PIXOUT voltage from a pixel, such as the pixel 108 in FIG. 6, that is selected in the activated row using the column number received from the column decoder 145. The CDS version of a pixout signal may be referred to as a "PIX_CDS" signal. The OTA 177 may also receive a Vramp voltage 143 from the ramp signal generator 163 (FIG. 7A). The OTA 177 may generate an output current if the pixout voltage 157 drops below the Vramp voltage 143, as discussed below with reference to FIG. 8. The output of the OTA 177 may be filtered by the second OTA 179 before being applied to the binary counter 181. In one embodiment, the binary counter 181 may be a 10-bit ripple counter that receives a Clock (Clk) input 185 and generates a timestamp value 186 based on the clock cycles counted during a pre-determined time triggered by the generation of the output current by the first OTA 177. In the context of the embodiment in FIG. 7A, the Clk input 185 may be a system-wide clock, an image sensor-specific clock generated by the PLL unit 168, or other clock generator (not shown) in the device 15. The pixel-specific timestamp value 186 may be stored in the line memory 183 against the column number (column #) of the pixel, and subsequently output to the digital processing block 167 as the Dout signal 140. The column number input 165 may be received from the column decoder unit 145 shown in FIG. 7A.

In particular embodiments, the RGB color model may be used for sensing, representation, and display of images on mobile devices, such as the device 15 in FIGS. 1 and 2. In the RGB color model, the light signals having three primary colors—red, green, and blue—may be added together in various ways to produce a broad array of colors in the final image. The CDS method may be used in 2D RGB imaging to measure an electrical value, such as a pixel/sensor output voltage, in a manner that allows removal of an undesired offset. For example, a CDS unit, like the CDS unit 176, may be employed in each column-specific ADC unit, like the ADC unit 175, to perform correlated double sampling. In CDS, the output of the pixel may be measured twice—once in a known condition, and once in an unknown condition. The value measured from the known condition may be then subtracted from the value measured from the unknown condition to generate a value with a known relation to the physical quantity being measured, that is, the photoelectron charge representing the pixel-specific portion of the image signal. Using CDS, noise may be reduced by removing the reference voltage of the pixel (such as the voltage of the pixel after it is reset) from the signal voltage of the pixel at the end of each integration period. Thus, in CDS, before the charge of a pixel is transferred as an output, the reset value is sampled. The reference value is "deducted" from the value after the charge of the pixel is transferred.

It is observed here that, in particular embodiments, the ADC unit 175 may be used for both 2D imaging as well as 3D-depth measurements. All the inputs for such shared configuration, however, are not shown in FIG. 7B. In the shared use case, the corresponding Vramp signal may be different as well for 2D imaging.

Figure 8:
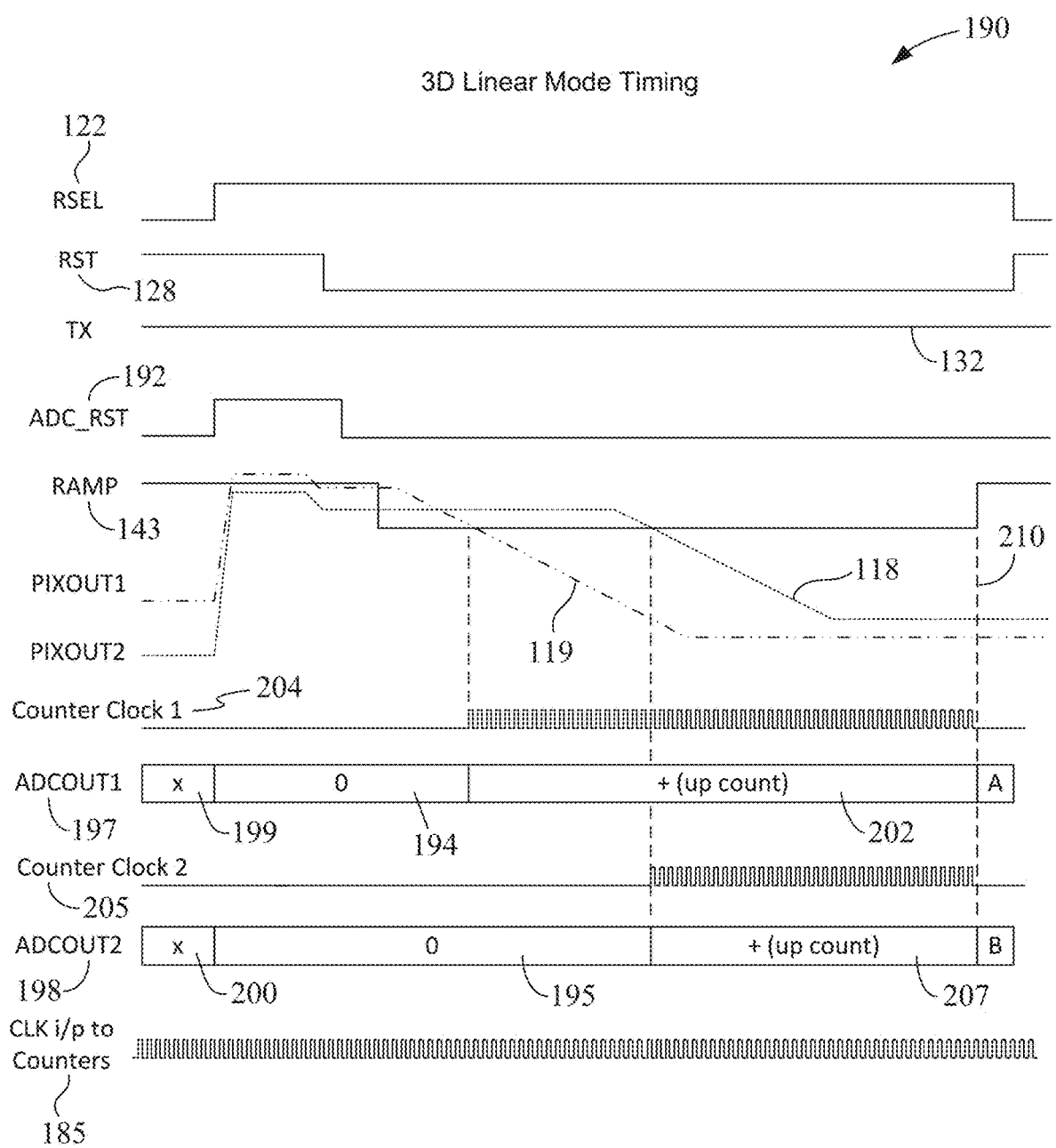
FIG. 8 is a timing diagram that shows exemplary timing of different signals in the system of FIGS. 1 and 2 to generate timestamp-based pixel-specific outputs in a 3D-linear mode of operation according to particular embodiments disclosed herein.

FIG. 8 is a timing diagram 190 that shows exemplary timing of different signals in the system 15 of FIGS. 1 and 2 to generate timestamp-based pixel-specific outputs in a 3D-linear mode of operation according to particular embodiments disclosed herein. As noted before, in particular embodiments, all pixels in the same image sensor 24 may be used for 2D as well as 3D imaging. The 3D-depth measurements, however, may be performed using a 3D-linear mode or a 3D-logarithmic mode depending on the level of ambient light. As discussed in more detail below with reference to FIG. 11, the 3D-logarithmic mode may be used for depth measurements if ambient light rejection is needed. The discussion of FIG. 8, however, relates to the timing waveforms associated with the 3D-linear mode.

Briefly, as discussed earlier with reference to FIGS. 4 and 5, the 3D object 26 may be point-scanned—one spot at a time—by the laser light source 33 along a row R 75 of the pixel array 42 in which R is known based on the corresponding epipolar relation with the scanning line $S_R$ 66. After scanning one row, the scanning operation repeats with another row. If the laser projects the next spot, the earlier-projected light spot may be imaged by the corresponding pixel in the row R. The pixel-specific outputs from all the pixels in the row R may be read out to the depth processing circuit/module in the digital processing block 167 (FIG. 7A).

Figure 10:
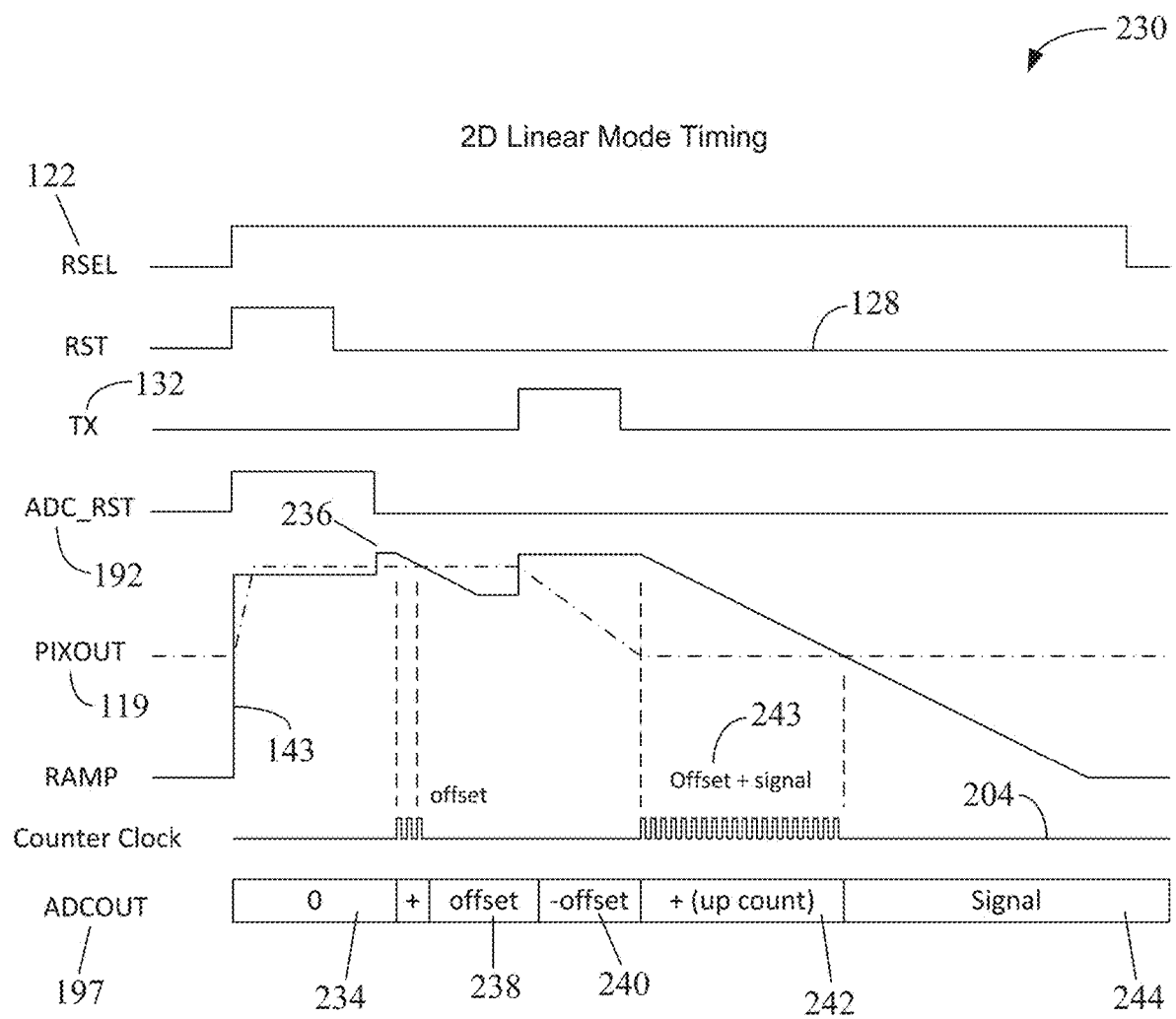
FIG. 10 is a timing diagram that shows exemplary timing of different signals in the system of FIGS. 1 and 2 to generate a 2D RGB image using a 2D-linear mode of operation according to particular embodiments disclosed herein.
Figure 11:
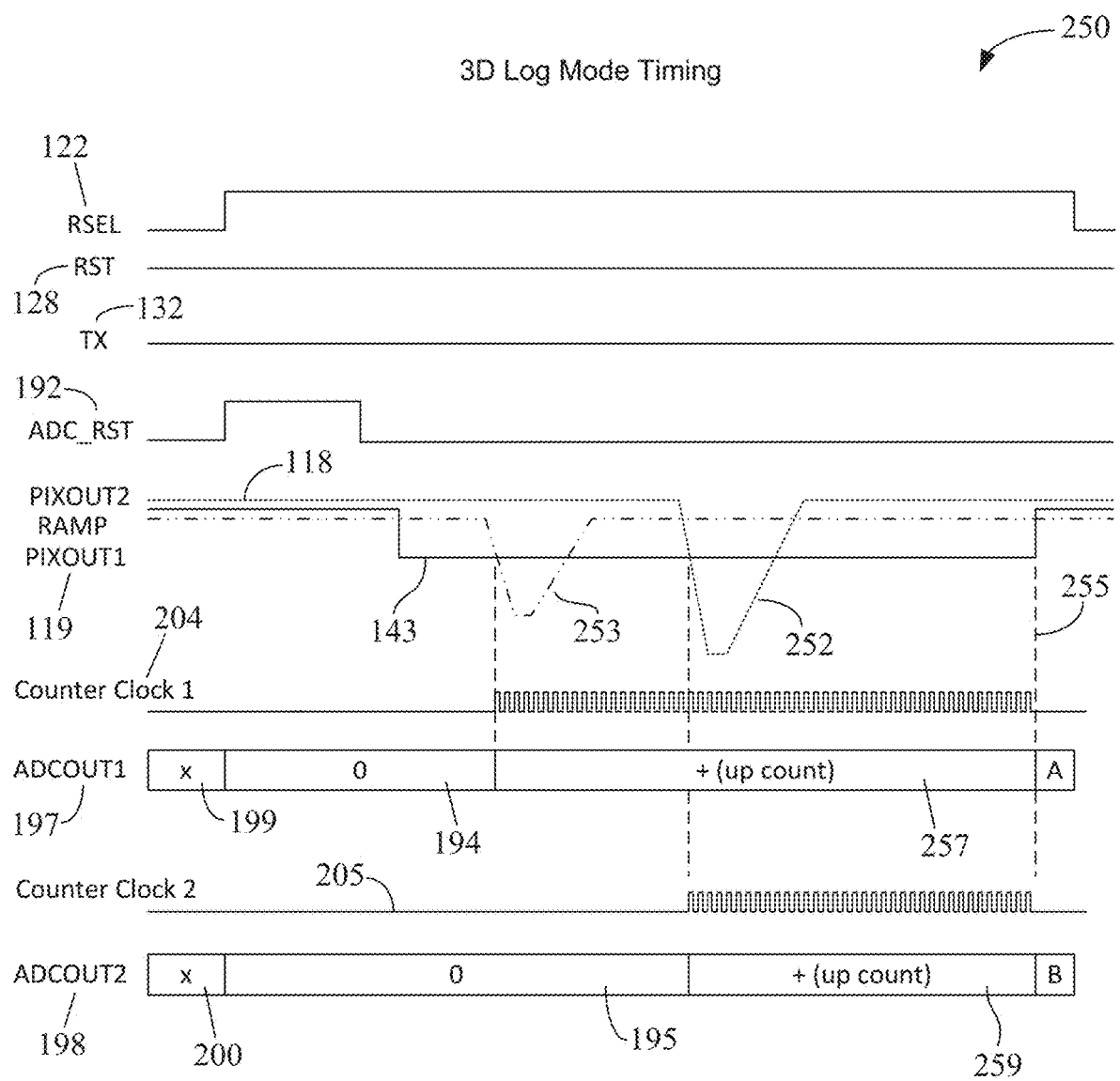
FIG. 11 is a timing diagram that shows exemplary timing of different signals in the system of FIGS. 1 and 2 to generate timestamp-based pixel-specific outputs in a 3D-logarithmic (log) mode of operation according to particular embodiments disclosed herein.

To generate a pixel-specific output, the corresponding row may have to be initially selected using an RSEL signal. In the context of FIG. 8, it is assumed that the row decoder/driver 116 in FIG. 6 selects the row of pixels containing pixels 106-108 by asserting the RSEL signal 122 to a "high" level as shown in FIG. 8. Thus, all the pixels 106-108 are selected together. For ease of discussion, the same reference numerals are used in FIG. 8 for the signals, inputs, or outputs that are also shown in FIGS. 6 and 7. Initially, all the pixels 106-108 in the selected row may be reset to a high voltage using the RST line 128. The "reset" level of a pixel may represent an absence of the pixel-specific detection of a corresponding light spot. In the 3D-linear mode according to one embodiment disclosed herein, the RST signal 128 may be released from the high level for a pre-determined time to facilitate integration of photoelectrons received by the pixels 106-108, to obtain the corresponding pixel output (PIXOUT) signals 117-119, two of which are shown in FIG. 8 and discussed later below. The PIXOUT1 signal 119 represents the output supplied to a corresponding ADC unit by the pixel 108, and is shown using a dashed line having the pattern "-••-••-". The PIXOUT2 signal 118 represents the output supplied to a corresponding ADC unit by the pixel 107, and is shown using a dotted line having the pattern "••••••••••••••". On the other hand, in the 3D-logarithmic mode according to one embodiment disclosed herein, the RST signal may remain high for the selected row during generation of the pixel output as discussed later below. It is noted here that, in one embodiment, other RST lines, that is, like the lines 129-130 in FIG. 6, may remain high or "on" for unselected rows to prevent blooming. It is noted here that, strictly speaking, the PIXOUT signals 118 and 119 in FIG. 8 (and similar pixout signals in FIGS. 10 and 11) may be slightly modified by a CDS unit such as, the CDS unit 176 in FIG. 7B, before being applied as PIX_CDS signals to the first OTA, like the OTA 177 in FIG. 7B, in a respective column-specific ADC unit, such as the ADC unit 175 in FIG. 7B. For the simplicity of illustration and ease of discussion, however, the PIXOUT signals in FIGS. 8, 10 and 11 are treated as representatives of respective PIX_CDS signals (not shown) and are considered as having been directly "input" to the respective OTAs 177.

After reset, if a photodiode in a pixel receives incident luminance, such as the photoelectrons in the light reflected from a light spot projected on the surface of the 3D object 26, the photodiode may generate corresponding photocurrent. A detection of incident light by a pixel may be called an "ON event," whereas a decrease in the intensity of incident light may produce an "OFF event." The photocurrent generated in response to an ON event may decrease the pixel output voltage (PIXOUT) from the initial reset level. A pixel thus functions as a transducer to convert received luminance/light signal into a corresponding electrical (analog) voltage, which is generally designated as a PIXOUT signal in FIGS. 6, 8, 10 and 11. Each pixel may be read individually and, in one exemplary embodiment, in the sequence in which the corresponding light spots are projected by the laser source. The analog pixout signal may be converted to a digital value by the corresponding column ADC. In the 2D-imaging mode, the ADC may function as an analog-to-digital converter and generate a multi-bit output. As discussed below, however, in the 3D-depth measurement mode, the ADC may function as a time-to-digital converter and generate a timestamp value representing the time when a light spot is detected by a pixel.

Referring again to FIG. 8, after the pixel reset is done (with RST 128 high), the column ADCs associated with pixels 106-108 may be reset as well before the RST is released. The transfer (TX) signal 132 may, however, remain high throughout. The ADCs may be reset using either a common ADC reset signal or individual ADC-specific reset signals. In the embodiment of FIG. 8, a common ADC_RST signal 192 is shown to have been briefly asserted (to a high level) to reset the column-specific ADCs, like the ADC 175, in the column ADC unit 153 (FIG. 7A). In one embodiment, the ADCs may be reset to a pre-determined binary value, such as a binary "0" or other known number, after the pixels are reset. In FIG. 8, these reset values for ADCs associated with pixels 108 and 107 are respectively shown by "fields" 194 and 195 in the signals ADCOUT1 (or ADC output "A") and ADCOUT2 (or ADC output "B"). It is noted here that the term "field" is used here for the sake of convenience only when discussing the ADC outputs shown in FIGS. 8, 10 and 11. It is understood that an ADC output may not actually comprise all of such "fields" at the same time, but may be a specific digital value depending on the current stage of signal processing for the ADC, that is, if the ADC is reset, the output may be a binary "0," and if the ADC is triggered to count clock pulses, the output may be a count value as in case of the 3D-depth measurements in FIGS. 8 and 11. If the ADC is used for 2D color imaging (as in case of FIG. 10), then the output may be a multi-bit value representing an image signal. Thus, the ADC output signals in FIGS. 8, 10 and 11 are depicted with such "fields" merely to illustrate different digital values an ADC may internally generate in progressing toward the final output. In FIG. 8, the reference numeral "197" is used to refer to the ADCOUT1 signal representing the output of the ADC associated with the pixel 108, and the reference numeral "198" is used to refer to the ADCOUT2 signal representing the output of the ADC associated with the pixel 107. Each of the outputs 197 and 198 may appear as the Dout signal 140 (FIGS. 6 and 7) when the respective ADC is selected by the column decoder during memory readout. Prior to being reset, the ADC outputs 197 and 198 may have unknown values, as indicated by the notation "x" in the fields 199 and 200.

After ADCs are reset, a pre-determined threshold value may be enabled by de-asserting the ramp input (Vramp) 143 to a pre-defined voltage level after the pixel reset signal 128 and ADC reset signal 192 are released. In the embodiment of FIG. 8, the RAMP input 143 is common to all column-specific ADCs, thereby providing the same Vramp voltage to each ADC. In other embodiments, however, different Vramp values may be applied to two or more ADCs through separate, ADC-specific ramp inputs. Furthermore, in particular embodiments, the Vramp threshold may be a programmable parameter, allowing it to be variable as desired. After the threshold (RAMP signal) is enabled, the pixel-specific ADCs may wait for the "ON event" of the corresponding pixel before starting the binary counters, like the counter 181 in FIG. 7B.

In the 3D-depth measurement mode, each ADC may generate a single-bit output (representing binary "0" or "1"), as opposed to a multi-bit output in case of the 2D-imaging mode (discussed below). Thus, in case of an RGB sensor, any color information received by a pixel in the RGB pixel array 42 may be effectively ignored. In the absence of any incident light detected by a pixel, the corresponding ADCOUT signal may remain at the binary "0" value. Thus, columns without any ON events may continue to have digital value "0" (or other known number) for their respective ADCOUT signals. As noted before, however, if a pixel is hit with incident light, the PIXOUT line of the pixel may start to droop from the reset level, as indicated by the downward slopes of the PIXOUT1 and PIXOUT2 signals in FIG. 8. Assuming that pixel charge is read starting with the pixel that receives the charge first, such a reading may start with the right-most pixel in a row and end with the left-most pixel as shown, for example, in FIG. 5 in which $t_1$ is the earliest time instant and $t_4$ is the latest time instant. Thus, in the embodiment of FIG. 8, the output of the pixel 108 (PIXOUT1) may be read before that of the pixel 107 (PIXOUT2). As soon as the progressively-drooping PIXOUT1 reaches the Vramp threshold 143, the single-bit ADCOUT1 may flip from binary "0" to binary "1." Instead of outputting the bit "1," however, the corresponding ADC may record the time when the bit flips from "0" to "1". In other words, the ADC associated with the pixel 108 may function as a time-to-digital converter by starting the binary counter in the ADC, as indicated by the "up count" field 202 in ADCOUT1. During the "up count" period, the counter in the ADC may count the clock pulses in the CLK signal 185, which may be applied to each ADC as shown, for example, in FIG. 7B. The counted clock pulses are shown by the Counter Clock-1 signal 204 in FIG. 8, and the counted value (in the "up count" field) may be provided as a pixel-specific output for the pixel 108. A similar counting may occur at the ADC associated with pixel 107 for the charge collected by the pixel 107, as indicated by the Counter Clock-2 signal 205 in FIG. 8. The pixel-specific counted value (in the "up count" field 207) may be provided by the respective ADC as a pixel-specific output for the pixel 107. After scanning all pixels in one row, the pixel-by-pixel charge collection operation may repeat with another row, while the outputs from the earlier-scanned row are read out to the depth calculation unit in the digital block 167.

Each ADC output may effectively represent a respective timestamp value providing a temporal indication of a detection by a pixel of a light spot on the object surface illuminated by the laser light source 33. A timestamp may be considered to capture the light arrival time for a pixel. In one embodiment, a timestamp value may be generated for a detected light spot by the digital processing block 167 from the count value (of the counted clock pulses) received from an ADC unit. For example, the digital block 167 may generate a timestamp by relating the count value to an internal system time or other reference time. The timestamp is generated at the receiving end and, hence, may not necessarily represent the exact time when the corresponding light spot was projected by the light source. The timestamp values may, however, allow the digital block 167 to establish a temporal correlation among timestamped light spots, thereby allowing the digital block 167 to determine distances to timestamped light spots in the time-wise order specified by the temporal correlation, that is, the distance to the earliest illuminated light spot being determined first, and so on, until the distance to the last-illuminated light spot is determined. In one embodiment, the timestamping approach may also facilitate resolution of the ambiguity that may arise from multiple light spots being imaged on the same pixel, as discussed later.

All ADC-based counters may stop simultaneously such as when the ramp signal 143 is asserted again after a pre-determined time period has elapsed. In FIG. 8, the transition of the ramp signal 143 marking the conclusion of the pre-determined time period for pixel charge integration is indicated by dotted line 210. The RSEL 122 and the RST 128 signals may also transition their states substantially simultaneously with the change in the level of the ramp signal 143 (at line 210). In one embodiment, all ADC-based counters may be reset at line 210. In another embodiment, all ADC-based counters may be reset at any time prior to the selection of the next row of pixels for reading the pixel charge. Despite resetting of ADC counters upon conclusion of scanning of pixels in one row, the timestamp value for each pixel in the pixel array 42 may remain distinct because of the relational establishment of the timestamp value against an internal system time or other reference source of time, which may remain global and continuously-running.

In the embodiment of FIG. 8, a later-scanned pixel, such as the pixel 107, may have a smaller ADC output than the pixel that is scanned earlier, such as the pixel 108. Thus, as shown, the ADCOUT2 may have less count value (or less number of clock pulses counted) than the ADCOUT1. Alternatively, in another embodiment, a later-scanned pixel may have a larger ADC output than an earlier-scanned pixel, for example, if each ADC-specific counter starts counting when a pixel is reset and stops counting when an "ON event" is detected such as, when the pixout signal of the pixel droops below a given threshold (Vramp).

It is noted here that circuits and waveforms shown in FIGS. 6, 8, 10 and 11 are based on single-slope ADCs with per column up-counters. It is understood, however, that the timestamping approach may be implemented with up- or down-counters depending on the design choice. Furthermore, single-slope ADCs with global counters may be used as well. For example, in one embodiment, instead of using individual, column-based counters, a global counter (not shown) may be shared by all column ADCs. In that case, the ADCs may be configured such that the column memory, like the line memory 183 in FIG. 7B, in each ADC may latch the output of the global counter to generate an appropriate ADC-specific output if a column-based comparator unit (not shown) detects an "ON event," such as when the column-based comparator unit first senses the respective pixout signal drooping below the ramp threshold 143.

Although not shown in FIG. 8, a dark current offset can be removed by decreasing the Vramp threshold at a rate that is the same as that of the dark current. Dark current may be a relatively small electric current that flows through a photosensitive device, such as a photodiode, even if no photons are entering the device. In image sensors, dark current may cause noise or unwanted artefacts in the collected charge. Dark current may be caused by defects in pixels and may have an effect like the photocurrent. Thus, due to the dark current, the pixel output may still decrease even without the existence of light (or in the absence of the light being received by the pixel). Thus, during charge collection, if the pixels in a row are scanned from right to left, for example, as shown in the context of row 75 in FIG. 5 and discussed with reference to FIG. 8, the pixels on the left side may integrate more dark current than the pixels on the right side. Therefore, in order to prevent registration of any false event due to dark current, the pre-determined ramp threshold (Vramp) may be decreased/adjusted by the rate that the dark current increases along the row of pixels to compensate for the reduced level of pixel output due to the dark current. In one embodiment, this adjusted threshold value may be then used for a pixel to compare the level of the PIXOUT signal of the pixel. Thus, the value of the threshold voltage (Vramp) may be variable and individually-programmable for each ADC. In one embodiment, all pixels associated with a specific ADC may have the same Vramp value. In another embodiment, each pixel may have a pixel-specific Vramp value programmable in the corresponding ADC.

It is observed here that, if a row of light spots is scanned along the surface of the object, two or more different spots from the object scanned may be imaged on the same pixel. The spots may be in the same scanning line or may be on adjacent scanning lines. If multiple spots are scanned across the surface of the object, such overlapping imaging may negatively affect the correlation of the spots and the pixel ON events and, hence, may cause ambiguity in the depth measurements. For example, it is seen from the earlier-mentioned Equation (1) that the depth measurement is related to the scan angle (θ) and the pixel location of the imaged light spot, as given by the parameter q in Equation (1). Thus, if the scan angle is not correctly known for a given light spot, the depth calculation may be inaccurate. Similarly, if two or more light spots have the same value of q, the depth calculations may become ambiguous as well. The timestamp-based approach according to particular embodiments disclosed herein may be used to maintain the correct correlation between the pixel location of a captured light spot and the corresponding scan angle of the laser source. In other words, a timestamp may represent an association between the values of parameters q and θ. Thus, if two spots land on the same pixel or column from the data output point of view, the time-to-digital conversion in the timestamping approach may allow the imaging system, that is, the digital processing block 167 (FIG. 7B), to establish a temporal correlation between these two spots to identify which light spot was received first in time. Such correlation may not be easily possible in systems that do not use timestamping, such as, the earlier-discussed stereo vision systems or the systems using the structured light approach. As a result, such systems may need to perform a lot of data searching and pixel-matching to solve the correspondence problem.

In one embodiment, if multiple light spots are imaged by the same pixel, timestamps of these light spots may be compared to identify the earliest-received light spot and the distance may be calculated for that light spot only, while ignoring all subsequently-received light spots at the same pixel. Thus, in this embodiment, the timestamp of the earliest-received light spot may be treated as the pixel-specific output for the corresponding pixel. Alternatively, in another embodiment, the distance may be calculated for the last spot that is received the last in time, while ignoring all other light spots imaged by the same pixel. In either case, any light spot received between the first or the last light spot may be ignored for depth calculations. Mathematically, the scan times of light spots projected by a light source may be given as $t(0), t(1), \ldots, t(n)$ in which $t(i+1)-t(i)=d(t)$ (constant). The pixel/column outputs may be given as $a(0)$, $a(1), \ldots, a(n)$, which are timestamps for the ON events and $a(i)$ is always after $t(i)$, but before $a(i+1)$. If $a(i)$ and $a(k)$ (i k) happen to be associated with the same pixel/column, only one of them may be saved as discussed before to remove any ambiguity in depth calculations. Based on the time relationship between the scan time and the output time (represented by timestamps), the processing unit, such as the digital block 167, can figure out which output point(s) is missing. Although the processing unit may not be able to recover the missing location, the depth calculations from the available output points may suffice to provide an acceptable 3D-depth profile of the object. It is noted here that, in one embodiment, it also may be possible for two different pixels to image a respective portion of the same light spot. In that embodiment, based on the closeness of the values of the timestamp outputs from these two pixels, the processing unit may infer that a single light spot may have been imaged by two different pixels. To resolve any ambiguity, the processing unit may use the timestamps to find an average of the respective location values q, and use that average value of q in Equation (1) to calculate the 3D depth for such a shared light spot.

Figures 9, 12:
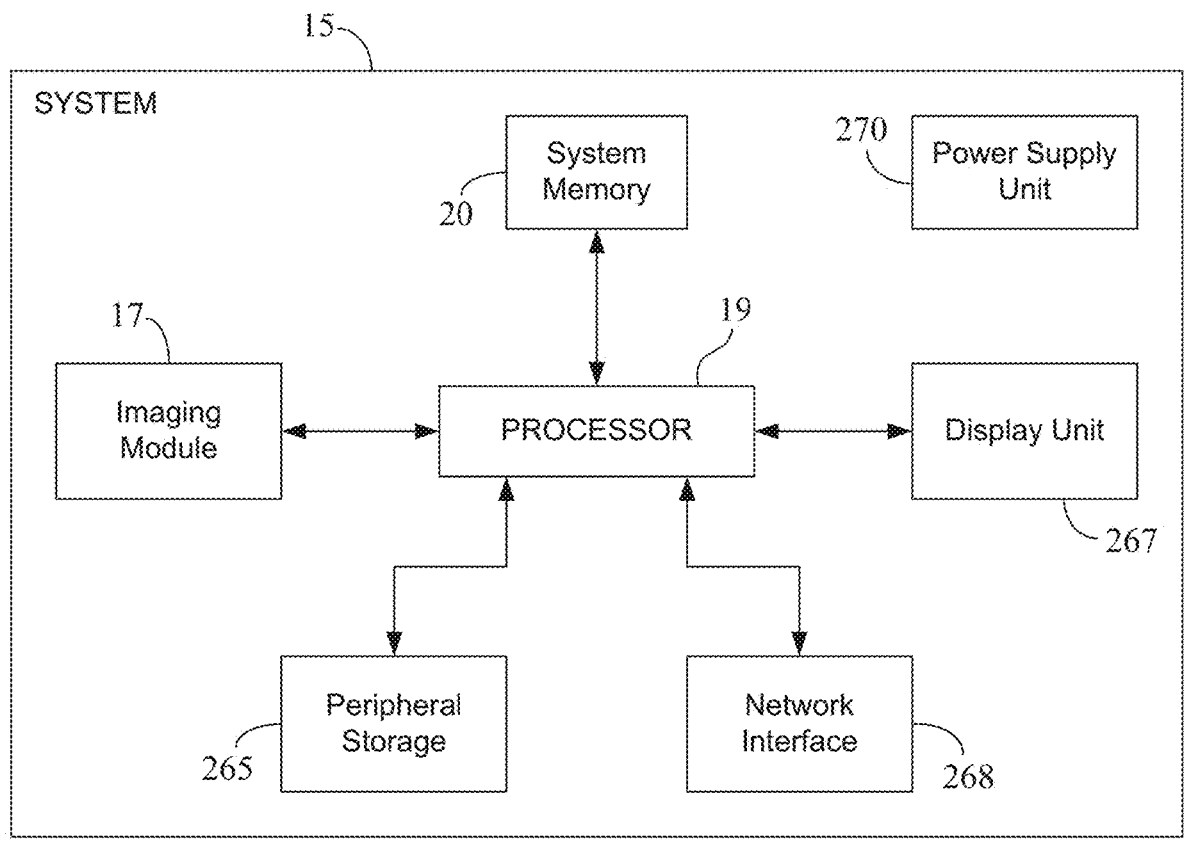
FIG. 9 shows an exemplary Look-Up Table (LUT) to illustrate how an LUT may be used in particular embodiments disclosed herein to determine 3D-depth values.
FIG. 12 depicts an overall configuration of the system in FIGS. 1 and 2 according to one embodiment disclosed herein.

FIG. 9 shows an exemplary Look-Up Table (LUT) 215 to illustrate how an LUT may be used in particular embodiments disclosed herein to determine 3D-depth values. The LUT-based approach may be used in place of the earlier-discussed triangulation-based depth calculations on-the-fly using the Equation (1). The LUT 215 lists the parameters θ, q, and Z for a scan line $S_R$. The relation among these parameters is given by Equation (1). The LUT 215 may be pre-populated with the values of these parameters for multiple scan lines—only one of which, the scan line $S_R$, is indicated in FIG. 9. The pre-populated LUT 215 may be stored in the system memory 20 (FIGS. 1 and 2), in the internal memory (not shown) of processor 19, or within the digital processing block 167 (FIG. 7A). Initially, to populate the LUT 215, a light spot along scan line $S_R$ may be projected at a reference distance $Z_i$, for example, 1 meter, and using a specific scan angle $\theta_i$. These pre-determined values of $Z_i$ and $\theta_i$ may be used in Equation (1) to obtain a corresponding value of $q_i$, which would indicate the column/pixel at which the imaged spot should appear for the scan line $S_R$. Different values of $Z_i$ and $\theta_i$ may be used to obtain corresponding values of $q_i$. If there is a ΔZ difference between the actual and pre-determined values of $Z_i$ for a light spot in scanning line $S_R$, the corresponding column/pixel should move by Δq. The values in the LUT 215 may be thus adjusted as necessary. In this manner, for each scanning line $S_R$, the LUT 215 may be pre-populated with depth values $Z_i$ as a function of $\theta_i$ and $q_i$ using the triangulation Equation (1). As noted before, the pre-populated LUT may be stored in the device 15. During operation, the actual values of $\theta_i$ and $q_i$ for each light spot in a scan line of light spots projected on a user-selected 3D object may be used as inputs to an LUT, like the LUT 215, to look-up the corresponding value $Z_i$. The processor 19 or the digital block 167 may be configured to perform such look-ups. Thus, in particular embodiments, the 3D profile of the object may be generated by interpolating into an LUT that has been calibrated using triangulation.

It is observed from the foregoing discussion that the timestamp-based 3D-depth measurement using triangulation according to particular embodiments disclosed herein allows an ADC to be operated as a binary comparator with a low resolution of just a single bit, thereby consuming significantly less switching power in the ADC and, hence, conserving the system power. A high bit resolution ADC in traditional 3D sensors, on the other hand, may require more processing power. Furthermore, timestamp-based ambiguity resolution may also save system power in comparison with traditional imaging approaches that require significant processing power to search and match pixel data to resolve ambiguities. The latency is reduced as well because all depth measurements may be performed in one pass due to imaging/detection of all point-scanned light spots in a single imaging step. In particular embodiments, each pixel in the pixel array may be a single-storage pixel and, hence, can be made as small as 1 micrometer (μm) in size. In a single-storage pixel design, there may be only one photodiode and one junction capacitor per pixel (like the transistor 111 in FIG. 6) to integrate and store photoelectrons. On the other hand, a pixel that has one photodiode with multiple capacitors to store photoelectrons coming at different times may not be reduced to such a small size. Thus, the low-power 3D-imaging system with small sensors as per particular embodiments disclosed herein may facilitate easy implementation in mobile applications such as, but not limited to, in cameras in smartphones or tablets.

As mentioned previously, the same image sensor, such as the image-sensor unit 24 in FIGS. 1 and 2, may be used for both 2D-imaging and 3D-depth measurements according to one embodiment disclosed herein. Such dual-mode image sensor may be, for example, part of a camera system on a mobile phone, smartphone, laptop computer, or tablet, or as part of a camera system in an industrial robot or VR equipment. In particular embodiments, there may be a mode switch on the device to allow a user to select between the traditional 2D-camera mode or the 3D-imaging mode using depth measurements as discussed before. In the traditional 2D-camera mode, in particular embodiments, the user may capture color (RGB) images or snapshots of a scene or a particular 3D object within the scene. In the 3D mode, however, the user may be able to generate a 3D image of the object based on the camera system performing the point scan-based depth measurements in the manner discussed earlier. In either mode, the same image sensor may be used in its entirety to carry out the desired imaging. In other words, each pixel in the image sensor may be used for either application-2D or 3D imaging.

FIG. 10 is a timing diagram 230 that shows exemplary timing of different signals in the system 15 of FIGS. 1 and 2 to generate a 2D image using a 2D-linear mode of operation according to particular embodiments disclosed herein. It is noted here that the 2D image may be an RGB image of a scene or a 3D object within the scene under ambient light illumination, which may include occasional use of a camera flash or other similar component (not shown). In contrast to the 3D imaging-related embodiments in FIGS. 8 and 11, however, there may not be any illumination by the laser light source 33 (FIG. 2) in case of the 2D imaging in the embodiment of FIG. 10. Many signals shown in FIG. 10 are also shown in FIG. 8. In view of the earlier detailed discussion of FIG. 8, only the salient aspects of FIG. 10 are discussed herein. It is noted here that the control signals RSEL, RST, TX, RAMP, and ADC_RST shown in FIG. 10 are for the row of pixels containing pixels 106-108 in FIG. 6 and, hence, for ease of discussion, these signals are identified using the same reference numerals as the reference numerals used in FIG. 8 despite the difference in waveforms and timing of the signals in FIGS. 8 and 10. Furthermore, the illustration in FIG. 10 is for a single pixel, that is, the pixel 108 in FIG. 6. Therefore, the PIXOUT signal 119, the Counter Clock signal 204, and the ADCOUT signal 197 in FIG. 10 are shown using the same reference numerals as those for corresponding signals PIXOUT1, Counter Clock-1 and ADCOUT1 in FIG. 8. The pixel output 119 is generated by linearly integrating the photoelectrons collected by the pixel 108 over a pre-determined time period. As before, the discussion of FIG. 10 in the context of pixel 108 remains applicable to corresponding signals associated with other pixels in the pixel array 42.

As noted before, in particular embodiments, each column-specific ADC, such as the ADC unit 175 in FIG. 7B, may be a single-slope ADC. As in case of FIG. 8, pixels in the same row may be selected and reset together, as shown by the RSEL signal 122 and the RST signal 128 in FIG. 10. The column ADCs may be reset also using the common ADC_RST signal 192. In FIG. 10, the reset state of the ADC associated with pixel 108 is indicated by the field 234 in the ADCOUT signal 197. After the pixel 108 and the corresponding ADC are reset, a threshold or reference voltage level may be enabled as shown by the voltage level 236 for the Vramp signal 143. The ramp then ramps down from this voltage level 236 to digitize the comparator offset of the ADC unit, as given by the field 238 in the ADCOUT signal 197. In one embodiment, the clock pulses in the counter clock 204 may be used to generate a count value as the offset 238. The clock pulses may be counted from the time the Vramp signal 143 reaches the threshold level 236 until it drops to the reset level of the pixel output—here, the PIXOUT signal 119. Thereafter, the respective transfer (TX) line 132 may be pulsed to trigger the transfer of charge accumulated on the photodiode 110 to the floating diffusion 111 for readout. While the TX pulse is asserted, the Vramp signal 143 may rise to the threshold level 236 and a counter in the pixel-specific ADC, such as the counter 181 in FIG. 7B, may be initialized with an inverted offset value as indicated by the field 240. The inverted offset value 240 may represent the negative of the offset value 238. After the TX pulse 132 is de-asserted, the ADC unit for the pixel 108 may start digitizing the received pixel signal (PIXOUT) until the Vramp threshold 143 drops to the level of the PIXOUT signal 119. This operation is illustrated by the "up count" field 242 in the ADCOUT signal 197. The count value 242 may be based on the clock pulses of the counter clock 204 and may represent a combined value including the offset count (at field 238) and the pixel-specific portion of the image signal for pixel 108, as illustrated using the reference numeral 243. A comparator (not shown) in the ADC unit may compare the comparator offset value digitized at field 238 against the "up count" value 242. Thus, in one embodiment, the RGB image signal 244 may be obtained by adding the ADC values in the fields 240 and 242, thereby effectively removing the offset value 238 from the combined value (offset+signal) in the "up count" field 242.

The operation illustrated in FIG. 10 may be performed for each pixel in the pixel array 42. Each column ADC may generate a corresponding RGB image signal in the form of a multi-bit output from the ADC-based counter, such as the counter 181 in FIG. 7B. The multi-bit output, like the output at reference numeral 244 in FIG. 10, may be needed to effectively represent the color content of the image signal. The RGB image signal outputs from the ADCs in the column ADC unit 153 may be collectively represented by the Dout signal 140 (FIGS. 7A and 7B), which may be processed by the digital block 167 to present the 2D color image of the scene via the MIPI interface 168.

Additional details of the 2D imaging and related waveforms shown in FIG. 10 may be obtained from the U.S. Pat. No. 7,990,304 B2 issued on Aug. 2, 2011 to Lim et al. The 2D imaging-related discussion in U.S. Pat. No. 7,990,304 related to the subject matter disclosed herein is incorporated herein by reference in its entirety.

FIG. 11 is a timing diagram 250 that shows exemplary timing of different signals in the system 15 of FIGS. 1 and 2 to generate timestamp-based pixel-specific outputs in a 3D-logarithmic (log) mode of operation according to particular embodiments disclosed herein. As mentioned earlier, the 3D-depth measurements may be performed using a 3D-linear mode or a 3D-logarithmic mode depending on the level of ambient light. Furthermore, during the 3D-depth measurements, a 3D object, such as the 3D object 26 in FIG. 2, may be illuminated by the ambient light as well as by the visible light (or other light, such as, NIR light) from the laser scan. Therefore, the 3D-logarithmic mode may be used for depth measurements if ambient light is too strong to be rejected by the 3D-linear mode. In view of the CDS-based imaging to remove the offset or other noise from the final image signal, a logarithmic mode may not be needed for the 2D imaging-related waveforms depicted in FIG. 10. In case of the 3D-depth measurements according to particular embodiments disclosed herein, however, a strong ambient light may interfere with the light from the laser light source during point scans. In the 3D-linear mode of operation, such interference may overwhelm or suppress the visible/NIR light reflected from a point-scanned light spot and, hence, may result in an inaccurate detection of the light received from the light spot. Hence, in particular embodiments, it may be desirable to reject the pixel charge attributable to the ambient light if the intensity of the ambient light is sensed to be above a pre-determined illuminance level (or intensity threshold), such as 10000 (10K) lux. Such ambient light rejection may be accomplished using the 3D-log mode of operation shown in FIG. 11.

As before, the same reference numerals are used in FIGS. 8, 10 and 11 to refer to the similarly-named signals (or signals having similar functionality) and also for ease of discussion. It is understood, however, that the signals shown in FIGS. 8, 10 and 11 relate to specific modes of imaging. Thus, for example, the timing diagram 230 shown in FIG. 10 illustrates a specific relationship among the signals shown therein if a user selects a 2D color imaging mode of operation. The similarly-named signals in FIGS. 8 and 11, however, relate to a 3D-imaging mode of operation and, hence, may have different timing relationships. Furthermore, even between FIGS. 8 and 11, some signals may differ in waveforms because FIG. 8 relates to a 3D-linear mode of operation, whereas FIG. 11 relates to a 3D-log mode of operation. In view of the earlier detailed discussion of FIG. 8, only the salient aspects of FIG. 11 are discussed herein. Like FIG. 8, the timing diagram 250 in FIG. 11 is also with reference to pixels 107 and 108 in FIG. 6. The discussion of FIG. 11, however, remains applicable to all other pixels in the pixel array 42.

In the 3D-linear mode, the pixel-specific output may be generated by linearly integrating the photoelectrons collected by the pixel over a pre-determined time period. Thus, in the linear mode, an output voltage of a pixel is proportional to the total photons collected/integrated over a given time period. In the 3D-log mode, however, the pixel-specific output may be proportional to the natural logarithm of an instantaneous photo-current produced by the pixel during the pre-determined time period upon detecting the laser light reflected from the 3D object. Mathematically, the photo current generated by a photodiode, such as the PPD 110 in FIG. 6, may be represented by the following relationship:

$$I_{ph} \propto e^{\frac{V_{ph}}{V_T}}, \tag{2}$$

in which $I_{ph}$ is the photocurrent of the diode, $V_{ph}$ is the voltage across the diode, and $V_T$ is the thermal voltage. Thus, $V_{ph}$ and, hence, the respective pixel output (PIXOUT) may be made proportional to the natural logarithm of the instantaneous diode current $I_{ph}$, such as if ambient light rejection is desired. As noted before, heavy ambient light may restrict photon collection if linear integration is done. Hence, in such circumstances, the sensing of instantaneous photocurrent using the 3D-log mode may be more desirable.

In particular embodiments, the device 15 may include an ambient light sensor (not shown). The processor 19 or the digital block 167 may be configured to sense the ambient light intensity as soon as the 3D-imaging mode is selected by the user to determine whether to use the 3D-linear mode or the 3D-log mode. In one embodiment, the ambient light level may be sensed substantially simultaneously with the assertion of an RSEL signal, which may indicate the initiation of the imaging of the light reflected from the point-scanned light spots. In another embodiment, the ambient light level may be sensed substantially simultaneously with the initiation of the visible-light point scan by the laser source. Based on the level of the ambient light, the processor 19 or the digital block 167 may choose either the 3D-linear mode or the 3D-log mode of depth measurements. In a still further embodiment, the ambient light level may be sensed periodically and continuously during a 3D-depth measurement. In that case, the 3D mode of operation may be switched from linear to logarithmic, and vice versa, at any time prior to or during an ongoing imaging operation. Other approaches for sensing the ambient light level may be suitably devised.

Referring now to the embodiment of FIG. 11, it is observed that, in the 3D-logarithmic mode, the row-specific RST signal 128 may be asserted (or turned on "high") and may remain high/asserted for the selected row during the entire period of generation of the pixel output. In contrast, in the 3D-linear mode of FIG. 8, the RST signal 128 may be initially asserted (or turned on "high") to reset the pixels in the row to a pre-determined voltage level, but later turned off (or de-asserted) during linear integration of the photoelectrons. The TX signal 132, however, may remain high, like in case of the 3D-linear mode of FIG. 8. Thus, in particular embodiments, the appropriate level of the RST signal may be used to select the linear mode versus the logarithmic mode. In the logarithmic mode, in one embodiment, after the ADCs associated with pixels 107 and 108 are reset using the ADC RST signal 192, the ADCs may initially sample the ambient level to enable the ADCs to appropriately account for the signal levels of the pixel output (PIXOUT) signals when the signals are received. After ADCs are reset, the RAMP threshold 143 may be enabled, and the ADC counters may enter a "wait state" to wait for an "ON event" to occur at the respective pixel. If a pixel receives incident light (reflected from a projected light spot), the PIXOUT signal of the pixel may start drooping. In contrast to the linear drop in FIG. 8, the PIXOUT signals 118 and 119 in FIG. 11 may respectively exhibit short, instantaneous drops 252 and 253, which reflect the instantaneous photo-current produced by the detection of the reflected visible light by the respective pixel. If the PIXOUT signals 118 and 119 reach the pre-determined Vramp threshold 143, the ADC counters may start counting. All counters may stop simultaneously after a pre-determined time for charge integration is over, as given by the transition of the RAMP signal 143 to the "high" state and as indicated by the dotted line 255. The counted values are indicated by the data field 257 of ADCOUT1 and the data field 259 of the ADCOUT2 signals for pixels 108 and 107, respectively. The count values in the logarithmic mode may be different from those in the linear mode and, hence, different reference numerals are used for the "up count" fields in the ADCOUT signals in FIGS. 8 and 11. As in case of FIG. 8, pixel scanned later may have a smaller count value for the ADC output than the one that is scanned earlier.

As mentioned earlier with reference to FIG. 8, instead of per column up-counters, down counters may be used in the ADC units in the embodiments of FIGS. 10 and 11. Similarly, a global counter-based approach may be implemented instead of individual ADC-specific counters.

Thus, as discussed above, the same image sensor (and all of the pixels in the corresponding pixel array) may be used as per the subject matter disclosed herein for routine 2D imaging as well as for 3D-depth measurements. In the 2D mode, the sensor may work in the linear mode as a regular 2D sensor. During the 3D-depth measurements, however, the sensor may operate in a linear mode under moderate ambient light, but may switch to a logarithmic mode of signal detection under strong ambient light to be able to use the visible (or NIR) light source. Thus, the imaging approaches discussed herein may be compatible with existing 2D-sensor designs because the same 4T PPD pixel may be used for both 2D and 3D imaging. This allows for the sensor design to be small in size (with smaller pixels), more versatile, and operable at low power. These attributes, in turn, save space and cost for mobile devices containing such an image sensor. Furthermore, in consumer mobile devices and certain other applications, the usage of visible light laser (in addition to the ambient light) for 3D-depth measurements may be better for eye safety than conventional Near Infrared (NIR) sensors. At the visible spectrum, the sensor may have higher quantum efficiency than at the NIR spectrum, leading to lower power consumption for the light source, which, in turn, conserves power in the mobile devices.

One exemplary embodiment disclosed herein comprises a 2D pixel array in which 2D color image information and 3D-depth information are concurrently obtained to provide a fully synchronized frame rate, phase of color, depth and point of view. In one exemplary embodiment, the color image information and the 3D-depth information are output from the rows of the 2D pixel array in an interleaved or alternating-type of manner. That is, color image information is output from a first selected row followed by depth information output from the same row, then color image information is output from a next selected row followed by depth information output from the same next row, and so on. Alternatively, depth information is output from a first selected row followed by color image information output from the same row, then depth information is output from the next selected row followed by color image information output from the same next row, and so on.

According to the subject matter disclosed herein, the exemplary embodiments depicted in FIGS. 1, 2, 6, 7A and 7B may comprise a 2D pixel array in which 2D color image information and 3D-depth information are concurrently obtained to provide a fully synchronized frame rate, phase of color, depth and point of view. In one exemplary embodiment an image sensor unit 24 comprises a two-dimensional (2D) pixel array arranged in a plurality of rows in which each pixel of the array is substantially identical to other pixels of the array. In another exemplary embodiment, there may be one or more pixels of the array that are not substantially identical to other pixels of the array. In one exemplary embodiment, the rows of the array are operable to generate both 2D-color information of an object being imaged, as described herein, and are operable to generate 3D-depth information of the object, as described herein. In another exemplary embodiment, one or more of the rows of the array are operable to generate both 2D-color information and 3D-depth information, and other rows of the array are operable to generate either 2D-color information or 3D-depth information, but not both types of information. In another exemplary embodiment, the particular rows that are scanned for 2D-color information and/or 3D-depth information may be fewer than the total number of rows of the 2D pixel array. In one exemplary embodiment, concurrently generating both 2D-color information and 3D-depth information does not require a frame buffer because digital signal processing of the output information is not required, and the information is output shortly after it is acquired.

Figure 13:
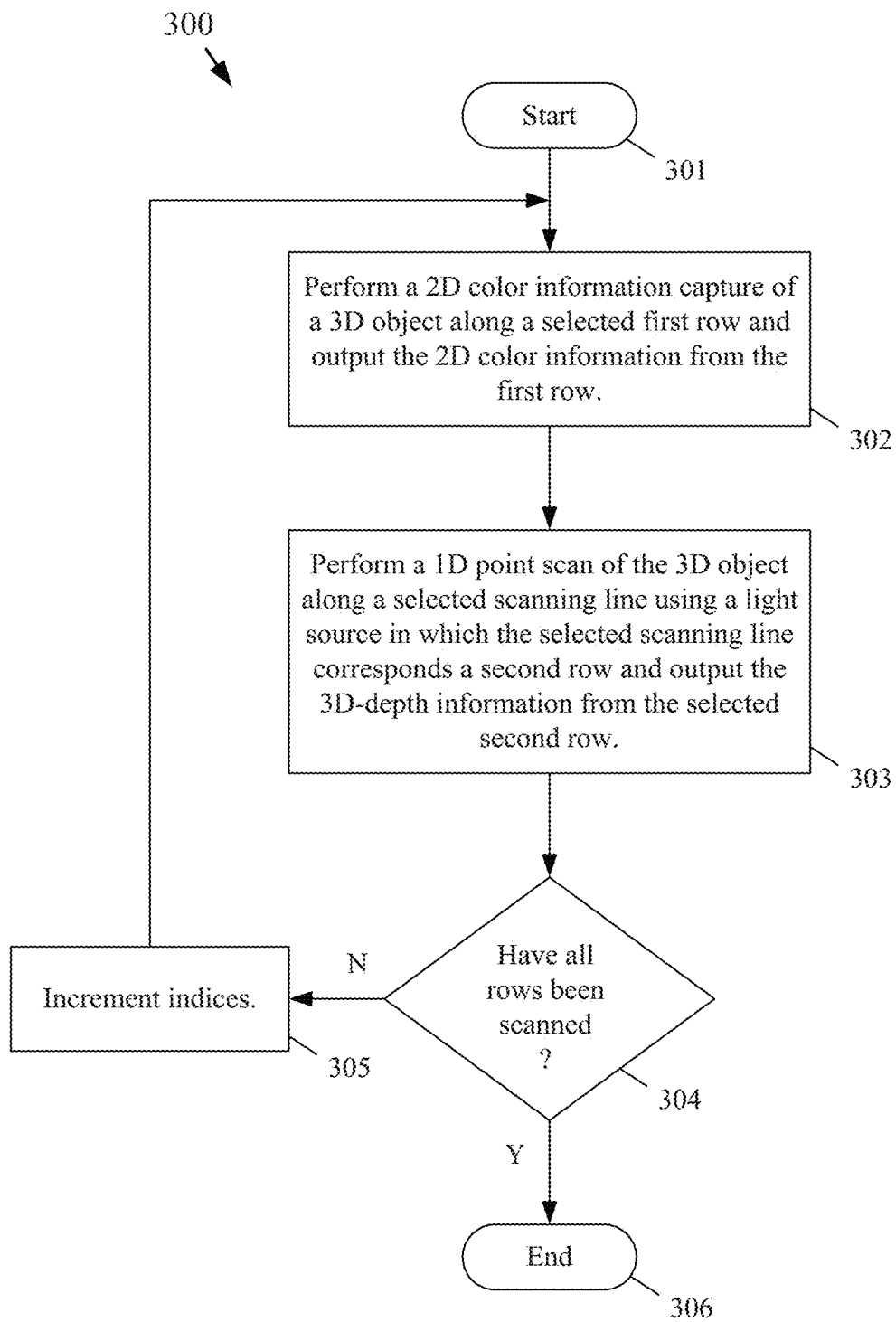
FIG. 13 depicts an exemplary flowchart of a process to concurrently generate and obtain 2D-color information and 3D-depth information according to embodiments disclosed herein.

FIG. 13 depicts an exemplary flowchart of a process 300 to concurrently generate and obtain 2D-color information and 3D-depth information according to embodiments disclosed herein. The various operations illustrated in FIG. 13 may be performed by a single module or a combination of modules or system components in, for example, the system 15. In the discussion herein, by way of an example only, specific tasks are described as being performed by specific modules or system components. Other modules or system components may be suitably configured to perform such tasks as well.

The process starts at block 301. At block 302, the system 15 (or more specifically, the processor 19) may perform a 2D-color image capture of an object, such as the object 26 (FIG. 2), along a first row of the 2D pixel array 42 (FIG. 42). In one exemplary embodiment, the first row may be the first physical row (corresponding to either the first or the last row as depicted in, for example, FIG. 6) of the 2D pixel array 42. In another exemplary embodiment, the first row may be different from the first physical row (corresponding to either the first or the last row as depicted in, for example, FIG. 6) of 2D pixel array. In one exemplary embodiment, the color image information is read out from the 2D pixel array 42, as described in connection with FIG. 6.

At block 303, the system 15 may perform a one-dimensional (1D) point scan of the 3D object, such as the object 26 in FIG. 2, along a scanning line using a light source, such as the light-source module 22 in FIG. 2. In one exemplary embodiment, the selected scanning line corresponds to a second row that may correspond to the same row that was scanned for the color image information in block 302. In another exemplary embodiment, the selected scanning line corresponds to a second row that may not correspond to the same row that was scanned for the color image information in block 302. The 3D-depth information is read out from the 2D pixel array 42, as described in connection with FIG. 6. In one exemplary embodiment, the order of blocks 302 and 303 could be reversed.

At block 304, the system 15 determines whether all of the rows of the 2D pixel array have been scanned for both color image information and for 3D-depth information. If not, the process flows to block 305 where the indices corresponding to the rows of the color image information scan and the rows of the 3D-depth information scan are incremented (or decremented as the case may be), and the process returns to block 302. In an exemplary embodiment in which the 2D-color information and the 3D-depth information are obtained from the same row, the indices could be the same index. In an exemplary embodiment in which the 2D-color information and the 3D-depth information are obtained from different rows, the indices may be different. If, at block 304, it is determined that all of the rows of the 2D pixel array have been scanned for both color image information and for 3D-depth information, flow continues to block 306 where the process ends.

In one exemplary embodiment in which the number of rows outputting 2D-color information is greater than the number of rows outputting 3D-depth information, a selected number of rows of color image information could be output for each row of 3D-depth information in an interleaved or alternating-type of manner.

In one exemplary embodiment, the same row R (or column C) of could be scanned multiple times to adaptively adjust the timing and/or the intensity of the point illuminations output from the laser light source (i.e., adjust the timing of the laser pulses) so better coincide with the response time of each particular pixel in a row and with the mechanical characteristics of the projection optics 35 (FIG. 2). Such a technique could be used to calibrate the imaging module 17 (FIG. 1).

Figure 14:
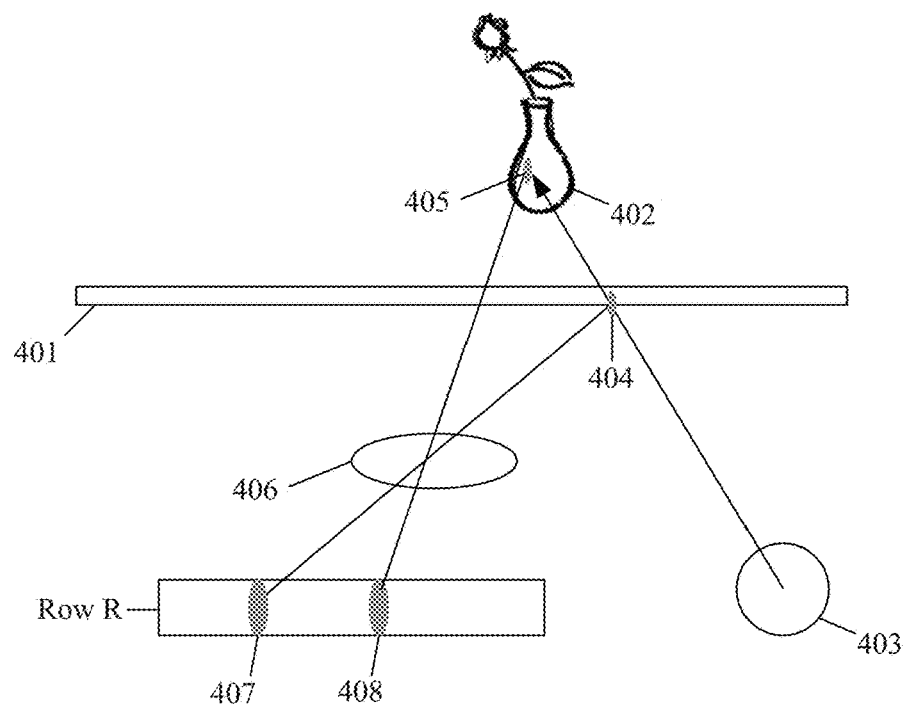
FIG. 14 depicts an exemplary illustration of how the distance to a semi-transparent object and the distance to an object behind the semi-transparent object may be performed for 3D-depth measurements according to one embodiment disclosed herein.

FIG. 14 depicts an exemplary illustration of how the distance to a semi-transparent object 401, such as glass, and the distance to an object 402 behind the semi-transparent object 401 may be performed for 3D-depth measurements according to one embodiment disclosed herein. In FIG. 14, an X-Y addressable light source 403, such as a laser light source, point scans object 402 through the semi-transparent object 401. Reflection 404 from the semi-transparent object 401 and reflection 405 from the object 402 pass through lens 406 and are respectively detected by pixels 407 and 408 in a row R of the 2D pixel array. Both detected reflections 407 and 408 information will have substantially the same timestamps, and the output depth of both reflections can be determined, as disclosed herein.

Figure 15:
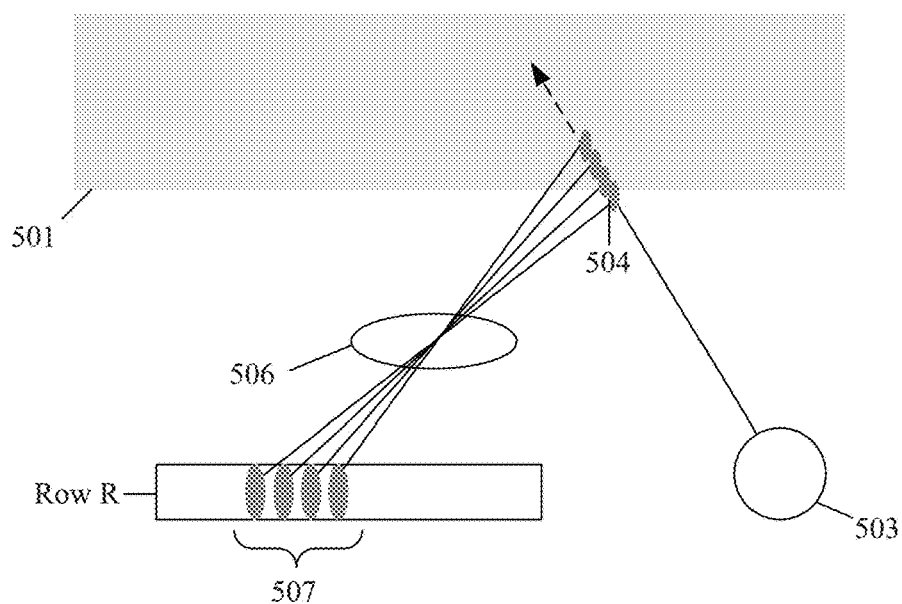
FIG. 15 depicts an exemplary illustration of how depth imaging of a semi-transparent medium may be performed for 3D-depth measurements according to one embodiment disclosed herein.

FIG. 15 depicts an exemplary illustration of how depth imaging of a semi-transparent medium 501, such as fog, rain, etc., may be performed for 3D-depth measurements according to one embodiment disclosed herein. As an X-Y addressable light source 503, such as a laser light source, point scans the semi-transparent medium 501, reflections 504 will pass through a lens 506 and a range of pixels 507 in a row R of the 2D pixel array will be activated that will have substantially the same timestamp. The thickness of medium 501 can be determined based on the timestamps as disclosed herein.

Figure 16:
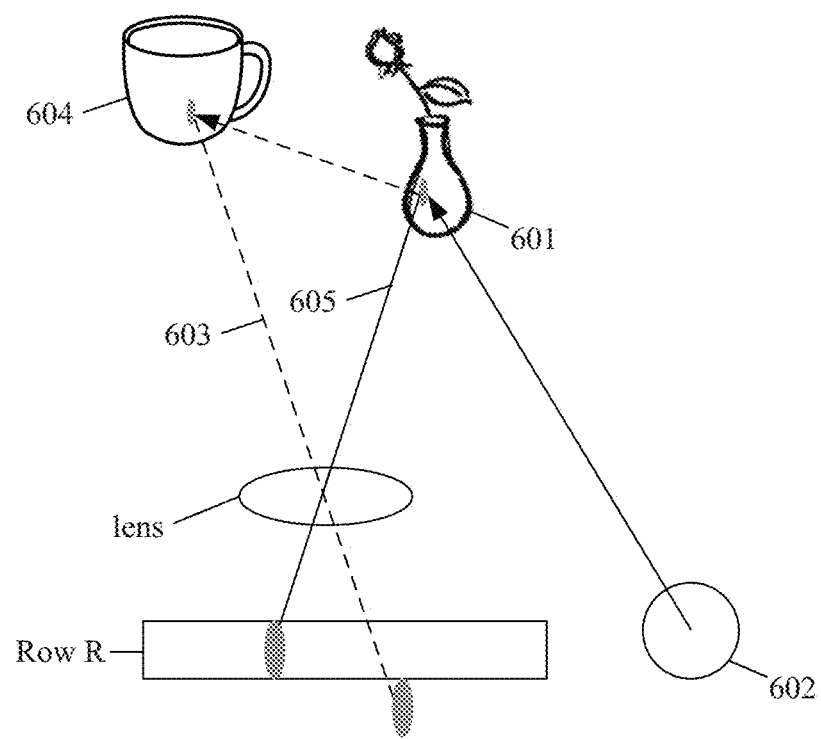
FIG. 16 depicts an exemplary illustration of how depth imaging of an object may be performed for 3D-depth measurements in the presence of multiple return paths according to one embodiment disclosed herein.

FIG. 16 depicts an exemplary illustration of how depth imaging of an object 601 may be performed for 3D-depth measurements in the presence of multiple return paths according to one embodiment disclosed herein. As an X-Y addressable light source 602, such as a laser light source, point scans the shiny object 601 a stray reflection 603 may be returned from another object 604. In this situation, the stray reflection 603 would likely not be within the epipolar plane of the row R being scanned and, consequently, would not be detected as a reflection 605 from the object 601 on which the point scan was directed.

FIG. 12 depicts an overall configuration of the system 15 in FIGS. 1 and 2 according to one embodiment disclosed herein. Hence, for ease of reference and discussion, the same reference numerals are used in FIGS. 1, 12 and 12 for the common system components/units.

As discussed earlier, the imaging module 17 may include the hardware shown in the exemplary embodiments of FIGS. 2, 6, 7A, 7B and 13 to accomplish 2D imaging and 3D-depth measurements as per the subject matter disclosed herein. The processor 19 may be configured to interface with a number of external devices. In one embodiment, the imaging module 17 may function as an input device that provides data inputs, that is, in the form of pixel event data such as, the processed data output 170 in FIG. 7A, to the processor 19 for further processing. The processor 19 may also receive inputs from other input devices (not shown) that may be part of the system 15. Some examples of such input devices include a computer keyboard, a touchpad, a touchscreen, a joystick, a physical or virtual "clickable button," and/or a computer mouse/pointing device. In FIG. 12, the processor 19 is shown coupled to the system memory 20, a peripheral storage unit 265, one or more output devices 267, and a network interface unit 268. In FIG. 12, a display unit is shown as an output device 267. In some embodiments, the output device 267 may comprise a touchscreen display. In some embodiments, the system 15 may include more than one instance of the devices shown. Some examples of the system 15 include a computer system (desktop or laptop), a tablet computer, a mobile device, a cellular phone, a video gaming unit or console, a machine-to-machine (M2M) communication unit, a robot, an automobile, a virtual reality equipment, a stateless "thin" client system, a vehicle dash-cam or rearview camera system, or any other type of computing or data processing device. In various embodiments, all of the components shown in FIG. 12 may be housed within a single housing. Thus, the system 15 may be configured as a standalone system or in any other suitable form factor. In some embodiments, the system 15 may be configured as a client system rather than a server system.

In particular embodiments, the system 15 may include more than one processor (e.g., in a distributed processing configuration). If the system 15 is a multiprocessor system, there may be more than one instance of the processor 19 or there may be multiple processors coupled to the processor 19 via their respective interfaces (not shown). The processor 19 may be a System on Chip (SoC) and/or may include more than one Central Processing Unit (CPU).

As mentioned earlier, the system memory 20 may be any semiconductor-based storage system such as, but not limited to, DRAM, SRAM, PRAM, RRAM, CBRAM, MRAM, STT-MRAM, and the like. In some embodiments, the memory unit 20 may include at least one 3DS memory module in conjunction with one or more non-3DS memory modules. The non-3DS memory may include Double Data Rate or Double Data Rate 2, 3 or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 20 may include multiple different types of semiconductor memories, as opposed to a single type of memory. In other embodiments, the system memory 20 may be a non-transitory data storage medium.

The peripheral storage unit 265, in various embodiments, may include support for magnetic, optical, magneto-optical, or solid-state storage media, such as hard drives, optical disks (such as Compact Disks (CDs) or Digital Versatile Disks (DVDs)), non-volatile Random Access Memory (RAM) devices, and the like. In some embodiments, the peripheral storage unit 265 may include more complex storage devices/systems, such as disk arrays (which may be in a suitable RAID (Redundant Array of Independent Disks) configuration) or Storage Area Networks (SANs), and the peripheral storage unit 265 may be coupled to the processor 19 via a standard peripheral interface, such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 267 may be an example of an output device. Other examples of an output device include a graphics/display device, a computer screen, an alarm system, a CAD/CAM (Computer Aided Design/Computer Aided Machining) system, a video game station, a smartphone display screen, or any other type of data output device. In some embodiments, the input device(s), such as the imaging module 17, and the output device(s), such as the display unit 267, may be coupled to the processor 19 via an I/O or peripheral interface(s).

In one embodiment, the network interface 268 may communicate with the processor 19 to enable the system 15 to couple to a network (not shown). In another embodiment, the network interface 268 may be absent altogether. The network interface 268 may include any suitable devices, media and/or protocol content for connecting the system 15 to a network, whether wired or wireless. In various embodiments, the network may include Local Area Networks (LANs), Wide Area Networks (WANs), wired or wireless Ethernet, telecommunication networks, or other suitable types of networks.

The system 15 may include an on-board power supply unit 270 to provide electrical power to various system components illustrated in FIG. 12. The power supply unit 270 may receive batteries or may be connectable to an AC electrical power outlet. In one embodiment, the power supply unit 270 may convert solar energy into electrical power.

In one embodiment, the imaging module 17 may be integrated with a high-speed interface such as, but not limited to, a Universal Serial Bus 2.0 or 3.0 (USB 2.0 or 3.0) interface or above, that plugs into any Personal Computer (PC) or laptop. A non-transitory, computer-readable data storage medium, such as, but not limited to, the system memory 20 or a peripheral data storage unit, such as a CD/DVD may store program code or software. The processor 19 and/or the digital processing block 167 (FIG. 7A) in the imaging module 17 may be configured to execute the program code, whereby the device 15 may be operative to perform the 2D imaging and 3D-depth measurements as discussed hereinbefore, such as the operations discussed earlier with reference to FIGS. 1-11 and 13-16. The program code or software may be proprietary software or open source software which, upon execution by the appropriate processing entity, such as the processor 19 and/or the digital block 167, may enable the processing entity to capture pixel events using their precise timing, process them, render them in a variety of formats, and display them in the 2D and/or 3D formats. As noted earlier, in certain embodiments, the digital processing block 167 in the imaging module 17 may perform some of the processing of pixel event signals before the pixel output data are sent to the processor 19 for further processing and display. In other embodiments, the processor 19 may also perform the functionality of the digital block 167, in which case, the digital block 167 may not be a part of the imaging module 17.

In the preceding description, for purposes of explanation and not limitation, specific details are set forth (such as particular architectures, waveforms, interfaces, techniques, etc.) in order to provide a thorough understanding of the disclosed technology. It will be apparent, however, to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as any elements developed that perform the same function, regardless of structure.

Thus, for example, it will be appreciated by those skilled in the art that block diagrams herein (e.g., in FIGS. 1 and 2) can represent conceptual views of illustrative circuitry or other functional units embodying the principles of the technology. Similarly, it will be appreciated that the flow chart in FIG. 3 represents various processes which may be substantially performed by a processor (e.g., the processor 19 in FIG. 12 and/or the digital block 167 in FIG. 7A). Such processor may include, by way of example, a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 1-11 and 13-16 also may be provided by such processor, in the hardware and/or software.

If certain aspects of the subject matter disclosed herein require software-based processing, such software or program code may reside in a computer-readable data-storage medium. As noted earlier, such data storage medium may be part of the peripheral storage 265 or may be part of the system memory 20 or the internal memory (not shown) of processor 19. In one embodiment, the processor 19 or the digital block 167 may execute instructions stored on such a medium to carry out the software-based processing. The computer-readable data storage medium may be a non-transitory data-storage medium containing a computer program, software, firmware, or microcode for execution by a general-purpose computer or a processor mentioned above. Examples of computer-readable storage media include a ROM, a RAM, a digital register, a cache memory, semiconductor memory devices, magnetic media, such as internal hard disks, magnetic tapes and removable disks, magneto-optical media, and optical media, such as CD-ROM disks and DVDs.

Alternative embodiments of the imaging module 17 or the system 15 comprising such an imaging module according to aspects of the subject matter disclosed herein may include additional components responsible for providing additional functionality, including any of the functionality identified above and/or any functionality necessary to support the solution as per the subject matter disclosed herein. Although features and elements are described above in particular combinations, each feature or element can be used alone without the other features and elements or in various combinations with or without other features. As mentioned before, various 2D- and 3D-imaging functions discussed herein may be provided through the use of hardware (such as circuit hardware) and/or hardware capable of executing software/firmware in the form of coded instructions or microcode stored on a computer-readable data-storage medium (mentioned above). Thus, such functions and illustrated functional blocks are to be understood as being either hardware-implemented and/or computer-implemented, and thus machine-implemented.

The foregoing describes a system and method in which the same image sensor, that is, all of the pixels in the image sensor, may be used to capture both a 2D image of a 3D object and 3D-depth measurements for the object. The image sensor may be part of a camera in a mobile device such as, but not limited to, a smartphone. A laser light laser source may be used to point scan the surface of the object with light spots, which may be then detected by a pixel array in the image sensor to generate the 3D-depth profile of the object using triangulation. In the 3D mode, the laser may project a sequence of light spots on the surface of the object along a scan line. The illuminated light spots may be detected using a row of pixels in the pixel array such that the row forms an epipolar line of the scan line. The detected light spots may be timestamped to remove any ambiguity in triangulation and, hence, to reduce the amount of depth computation and system power. A timestamp may also provide a correspondence between the pixel location of a captured laser spot and the respective scan angle of the laser light source to determine depth using triangulation. The image signals in the 2D mode may be represented by a multi-bit output from an ADC unit in the image sensor, but the ADC unit may produce just a binary output to generate timestamp values for 3D-depth measurements. To reject strong ambient light, the image sensor may be operated in a 3D-logarithmic mode as opposed to a 3D-linear mode.

As will be recognized by those skilled in the art, the innovative concepts described herein can be modified and varied over a wide range of applications. Accordingly, the scope of patented subject matter should not be limited to any of the specific exemplary teachings discussed above, but is instead defined by the following claims.

What is claimed is:

1. An image sensor unit, comprising:
a single two-dimensional (2D) pixel array arranged in a first predetermined number of rows of pixels, at least one first pixel in a first row of pixels being capable of generating 2D-color information of an object based on a first light reflected from the object and the at least one first pixel being capable of generating 3D-depth information of the object based on a second light reflecting from the object, the 3D-depth information being based on time-of-flight information of the object from the 2D pixel array; and
a controller coupled to the single 2D pixel array, the controller configured to control the 2D pixel array to output the 2D-color information and the 3D-depth information for the object by continuously selecting the at least one first pixel in the first row during a predetermined period of time and controlling the at least one first pixel to output the 2D-color information and to output the 3D-depth information while the at least one first pixel is continuously selected during the predetermined period of time.

2. The image sensor unit of claim 1, wherein the 2D-color information is output from the at least one first pixel before the 3D-depth information is output from the at least one first pixel.

3. The image sensor unit of claim 1, wherein the 3D-depth information is output from the at least one first pixel before the 2D-color information is output from the at least one first pixel.

4. The image sensor unit of claim 1, further comprising at least one second pixel in a second row of pixels capable of generating 2D-color information of the object based the first light reflected from the object and capable of generating 3D-depth information of the object based on the second light reflecting from the object, the second row being different from the first row, and
wherein the controller is further configured to control the 2D pixel array to output the 2D-color information and the 3D-depth information for the object by selecting the at least one second pixel in the second row to output the 2D-color information and to output the 3D-depth information while at least one second pixel is selected.

5. The image sensor unit of claim 4, wherein a first group of rows of pixels comprise a second predetermined number of rows, a second group of rows of pixels comprise a third pre-determined number of rows, the second predetermined number being equal to or less than the first predetermined number, the third predetermined number being equal to or less than the second predetermined number,
wherein the first row of pixels is in the first group of rows of pixels and the second row of pixels is in the second group of rows of pixels, and
wherein the controller is further configured to sequentially select, in an alternating manner, the first row from the first group of rows to output the 2D-color information and the 3D-depth information generated by the at least one first pixel of the first row and the second row from the second group of rows to output the 2D-color information and the 3D-depth information generated by the at least one second pixel.

6. The image sensor unit of claim 5, wherein the first row selected from the first group of rows is a same row as the second row selected from the second group of rows.

7. The image sensor unit of claim 5, wherein the first row selected from the first group of rows is different from the second row selected from the second group of rows.

8. The image sensor unit of claim 1, wherein the 3D-depth information comprises triangulation information corresponding to a scanned row of light spots reflected off the object.

9. The image sensor unit of claim 8, wherein the triangulation information comprises timestamp information for the scanned row of light spots.

10. The image sensor unit of claim 9, wherein the 3D-depth information is based on a linear integration of photoelectrons generated by the at least one first pixel.

11. The image sensor unit of claim 9, wherein the 3D-depth information is based on a logarithmic integration of photoelectrons generated by the at least one first pixel.

12. The image sensor unit of claim 9, further comprising a laser light source to illuminate the scanned row of light spots.

13. The image sensor unit of claim 12, wherein the laser light source comprises one of a visible laser light source, a near infrared laser light source, a point light source, a monochromatic illumination source, an X-Y addressable laser light source, or a Micro Electro-Mechanical System (MEMS) based laser scanner.

14. A system, comprising:
a single two-dimensional (2D) pixel array arranged in a first predetermined number of rows of pixels, at least one first pixel in a first row of pixels being capable of generating 2D-color information of an object based on a first light reflected from the object and the at least one first pixel being capable of generating 3D-depth information of the object based on a second light reflecting from the object, the 3D-depth information being based on triangulation information corresponding to a scanned row of light spots reflected off the object;

a controller coupled to the single 2D pixel array, the controller configured to control the 2D pixel array to output the 2D-color information and the 3D-depth information for the object by continuously selecting the at least one first pixel in the first row during a predetermined period of time and controlling the at least one pixel to output the 2D-color information and to output the 3D-depth information while the at least one first pixel is continuously selected during the predetermined period of time; and a display coupled to the single 2D pixel array and the controller, the display to display a first image of the object based on the 2D-color information and a second image of the object based on the 3D-depth information.

15. The system of claim 14, wherein the 3D-depth information is further based on time-of-flight information of the object from the 2D pixel array, and
wherein the triangulation information comprises timestamp information for the scanned row of light spots.

16. The system of claim 15, wherein the 3D-depth information is further based on a linear integration of photoelectrons generated by the at least one first pixel.

17. The system of claim 15, wherein the 3D-depth information is based on a logarithmic integration of photoelectrons generated by the at least one first pixel.

18. The system of claim 15, further comprising a laser light source to illuminate the scanned row of light spots, wherein the laser light source comprises one of a visible laser light source, a near infrared laser light source, a point light source, a monochromatic illumination source, an X-Y addressable laser light source, or a Micro Electro-Mechanical System (MEMS) based laser scanner.

19. The system of claim 14, wherein the system comprises part of a mobile communication device.

20. The system of claim 14, further comprising at least one second pixel in a second row of pixels capable of generating 2D-color information of the object based the first light reflected from the object and capable of generating 3D-depth information of the object based on the second light reflecting from the object, the second row being different from the first row,
wherein a first group of rows of pixels comprise a second predetermined number of rows, a second group of rows of pixels comprise a third predetermined number of rows, the second predetermined number being equal to or less than the first predetermined number, the third pre-determined number being equal to or less than the second predetermined number,
wherein the first row of pixels is in the first group of rows of pixels and the second row of pixels is in the second group of rows of pixels, and
wherein the controller sequentially selects, in an alternating manner, the first row from the first group of rows to output the 2D-color information and the 3D-depth information generated by the at least one first pixel of the first row and the second row from the second group of rows to output the 2D-color information and the 3D-depth information generated by the at least one second pixel.

* * * * *